United States Patent
Shveidel et al.

(10) Patent No.: US 11,875,060 B2
(45) Date of Patent: Jan. 16, 2024

(54) REPLICATION TECHNIQUES USING A REPLICATION LOG

(71) Applicant: Dell Products L.P., Hopkinton, MA (US)

(72) Inventors: Vladimir Shveidel, Pardes-Hana (IL); Vamsi K. Vankamamidi, Hopkinton, MA (US)

(73) Assignee: Dell Products L.P., Hopkinton, MA (US)

( * ) Notice: Subject to any disclaimer, the term of this patent is extended or adjusted under 35 U.S.C. 154(b) by 89 days.

(21) Appl. No.: 17/722,649

(22) Filed: Apr. 18, 2022

(65) Prior Publication Data
US 2023/0333777 A1  Oct. 19, 2023

(51) Int. Cl.
*G06F 12/00* (2006.01)
*G06F 3/06* (2006.01)

(52) U.S. Cl.
CPC ............ *G06F 3/0659* (2013.01); *G06F 3/065* (2013.01); *G06F 3/067* (2013.01); *G06F 3/0619* (2013.01); *G06F 3/0652* (2013.01)

(58) Field of Classification Search
None
See application file for complete search history.

(56) References Cited

U.S. PATENT DOCUMENTS

| | | | |
|---|---|---|---|
| 2005/0138461 A1* | 6/2005 | Allen | G06F 11/2071 714/E11.08 |
| 2009/0049054 A1* | 2/2009 | Wong | H04L 67/62 |
| 2010/0250491 A1* | 9/2010 | Jin | G06F 16/27 707/634 |

* cited by examiner

*Primary Examiner* — Daniel D Tsui
(74) *Attorney, Agent, or Firm* — Muirhead and Saturnelli, LLC

(57) ABSTRACT

Data replication techniques can include receiving, at a source system, a write directed to a source logical device configured for asynchronous remote replication to a destination system; performing processing that flushes a transaction log entry for the write; and performing replication processing that uses a replication queue including a replication queue entry corresponding to the write that stores the first content to a logical address. The processing can create a replication log entry in a replication log for the write responsive to determining that the write is directed to the source logical device configured for asynchronous remote replication and that the first content has not been replicated. Responsive to the first content not being in cache, the first content can be retrieved using the reference to a storage location storing the first content. The reference can be obtained from the replication log entry or the replication queue entry.

20 Claims, 18 Drawing Sheets

REPLICATION TECHNIQUES USING A REPLICATION LOG

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O (input/output) operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system and a non-transitory computer readable medium comprising: receiving, at a source system, a first write directed to a source logical device configured for asynchronous remote replication to a target logical device of a destination system; performing first processing on the source system that flushes a first transaction log entry of a transaction log of the source system, said first processing including: determining for the first transaction log entry, which represents the first write storing first content to a target logical address, that the first write is directed to the source logical device configured for asynchronous remote replication and that the first content has not been replicated from the source system to the destination system; and creating a first replication log entry for the first write and the first content in a replication log of the source system, wherein the first replication log entry includes a reference to a first storage location of the first content, wherein the replication log includes entries corresponding to other entries of the transaction log which have been flushed from the transaction log and which represent content and checkpoint commands that have not been replicated from the source system to the destination system; and performing replication processing that uses a replication queue including a first replication queue entry corresponding to the first write that stores the first content to the target logical address, the replication processing including: determining, for the first replication queue entry, that the first content written to the target logical address is not in a cache of the source system thereby resulting in a cache miss; responsive to the cache miss, retrieving the first content from the first storage location using the reference to the first storage location, wherein the reference to the first storage location is obtained from the first replication log entry or the first replication queue entry corresponding to the first write; and replicating the first content stored at the target logical address by the first written operation from the source system to the destination system.

In at least one embodiment, the transaction log can include a second transaction log entry for a first checkpoint command. Processing performed can include: issuing, by a replication service of the source system, a request to create a snapshot for the source logical device configured for asynchronous remote replication; and responsive to said issuing, creating the second transaction log entry in the transaction log and creating a second replication queue entry in the replication queue for the first checkpoint command. Processing performed can further include performing second processing on the source system that flushes the second transaction log entry. The second processing can include determining the first checkpoint command of the second transaction log entry has not been replicated from the source system to the destination system; and creating a second replication log entry for the first checkpoint command in the replication log. In accordance with the second replication queue entry, the first checkpoint command can be replicated from the source system to the target system.

In at least one embodiment, replication processing can include: replicating a first checkpoint command and a second checkpoint command from the source system to the destination system; replicating a plurality of writes from the source system to the destination system, wherein each of the plurality of writes is included between the first checkpoint command and the second checkpoint command, and wherein the second plurality of writes are directed to the source logical device; and creating, on the destination system in accordance with the first checkpoint command and the second checkpoint command, a first snapshot of the target logical device on the destination system, wherein the first snapshot includes the plurality of writes.

In at least one embodiment, the replication queue can be stored in volatile memory of the source system, the replication log can be persistently stored on the source system, and the transaction log can persistently stored on the source system. Restoration processing can be performed that restores the replication queue using the replication log and the transaction log. The restoration processing can include: identifying one or more unreplicated transaction log entries, wherein each of the one or more unreplicated transaction log entries is an entry of the transaction log for a write operation that writes content which has not been replicated from the source system to the target system; and constructing the replication queue which includes the one or more unreplicated transaction log entries and each entry of the replication log. The restoration processing can include sorting, based on a time order, the one or more unreplicated transaction log entries and each entry of the replication log. The time order can indicate a relative logical ordering in which to process entries of the replication queue. The restoration processing can be performed responsive to rebooting the source system. The restoration processing can be included in recovery processing, and wherein the recovery processing can be performed on the source system responsive to an event causing the source system to become unavailable or go offline.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
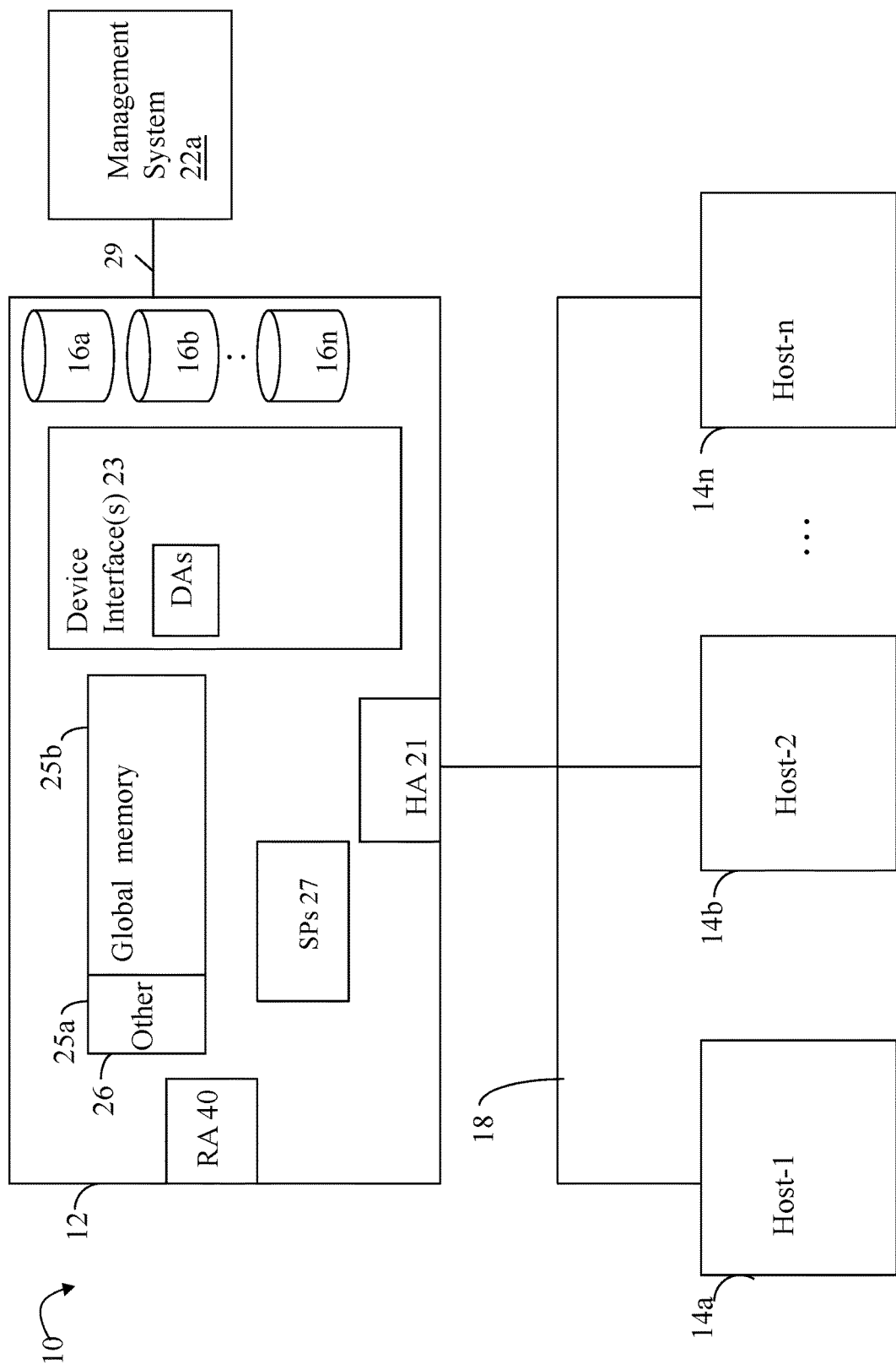
FIG. 1 is an example of components included in a system in accordance with the techniques of the present disclosure.

Data storage systems can perform different data services such as remote data replication (also referred to as remote replication). Generally remote replication provides for replicating data from a source system to a remote target system. For example, data on the source system can be a primary copy of a storage object which is remotely replicated to a counterpart remote storage object on the remote system. The remote storage object can be used, for example, in the event that the primary copy or source data storage system experiences a disaster where the primary copy is unavailable. Generally, remote replication can be used for any suitable purpose to increase overall system reliability and data availability. Remote data replication can be performed in a continuous ongoing manner where data changes or writes made to a source object on the source system over time can be replicated to the remote target system.

In at least one existing data storage system, the remote replication can be performed by a remote replication service or facility executing on the source system where the remote replication facility can use a technique referred to as a snapshot difference or snap diff technique. The snap diff technique provides for taking two successive snapshots of the logical device or other storage object on the source system that is replicated on the target system, and then determining the data difference with respect to the two successive snapshots. The data difference denotes the data blocks that have been written or modified in the time interval from a first point in time to a second later point in time, where a first snapshot is taken at the first point in time and a second successive snapshot is taken at the second point in time. The time interval may correspond, for example, to a recovery point objective (RPO) defined as the maximum amount of allowable data loss, as measured by time, that can be lost after a recovery from a disaster, failure, or comparable event before data loss will exceed what is acceptable to an organization. The snap diff technique can provide for taking a snapshot at each RPO interval. For example, for an RPO of 5 hours, a snapshot of the logical device can be taken on the source system every 5 hours and compared to the immediately prior snapshot to determine the data differences including data blocks that have been modified since the immediately prior snapshot. The data differences including the modified or newly written data blocks of the logical device are then transferred from the source system to the target system and applied to the remote copy of the logical device on the target or remote system.

The snap diff technique can be characterized as an expensive operation generally having a significant processing overhead. For example, in one embodiment of remote replication using the snap diff technique, creating a snapshot can include enforcing barriers used to denote points in time between writes where the writes between two such barriers can denote the writes included in a particular snapshot instance. In such an embodiment in which writes from a log are flushed to backend (BE) non-volatile storage, the recorded writes in the log between two barriers can denote the recorded writes of the log for a single snapshot. In some systems, flushing of recorded writes of the log can occur in parallel by multiple flushing threads. Additional dependencies and overhead can be incurred when enforcing such barriers and when synchronizing access to the records between the multiple flushing threads. In at least one system, snapshot creation can also require allocating new metadata pages used with the snapshot. Furthermore, once a particular snapshot used with replication is no longer needed, additional processing overhead can be incurred in connection with other operations such as deleting the snapshot.

High processing costs can also be incurred in connection with accessing data on the source system that is to be replicated to the target system, for example, in the event of a cache miss with respect to the write data or modified data content to be replicated. Replication processing on the source system can replicate write data stored in the cache. If the write data is not stored in the cache at the time needed for the replication processing, a cache miss occurs and the write data (denoting a modified data portion or block) is then accessed from the BE non-volatile storage. For example, in at least one system, the write data can remain in the cache until it is flushed from the log to the BE non-volatile storage. On the source system, snapshots can be created in connection with the snap diff technique with respect to a storage object, such as a logical device, while also flushing the write data stored in the cache for the same logical device. In some instances, the write data can be flushed from the cache and log before the write data has been replicated to the remote target system. In this case, when the time arrives to replicate the write data from the source system to the remote system, replication processing on the source system experiences a cache miss with respect to the write data and must then read the write data from the BE non-volatile storage. Reading the write data from the BE non-volatile storage can be an expensive processing operation as compared to reading the write data from the cache. For example in at least one existing system, accessing the write data on the BE non-volatile storage can require reading multiple layers of mapping information to identify the particular storage location of the write data on the BE non-volatile storage. Additionally, cache misses can result when attempting to read the foregoing mapping information since the mapping information is also required to be in cache in order to be read and used to identify the storage location of the write data on the BE non-volatile storage.

To overcome the foregoing drawbacks, described in the following paragraphs are techniques used to provide efficient data replication using a replication log on the source system. The replication log can denote write or modified data which has been flushed but which still needs to be replicated from the source system to the target system. The replication log can facilitate accessing the write or modified data in an efficient manner without using the mapping information. In at least one embodiment, the techniques can be used for efficient asynchronous replication of data with a high RPO and minimal performance impact. In at least one embodiment, the techniques of the present disclosure can be performed without using the expensive snap diff technique and without actually creating a snapshot with all its required metadata on the source system. In at least one embodiment, semantics associated with the snapshot, such as checkpoint or barrier records of the transaction log, replication log and replication queue, can be used to specify snapshot semantics such as, for example, for transactional write consistency across one or more LUNs, without actually constructing the metadata and other structures implementing the snapshot on the source system.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which can also referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
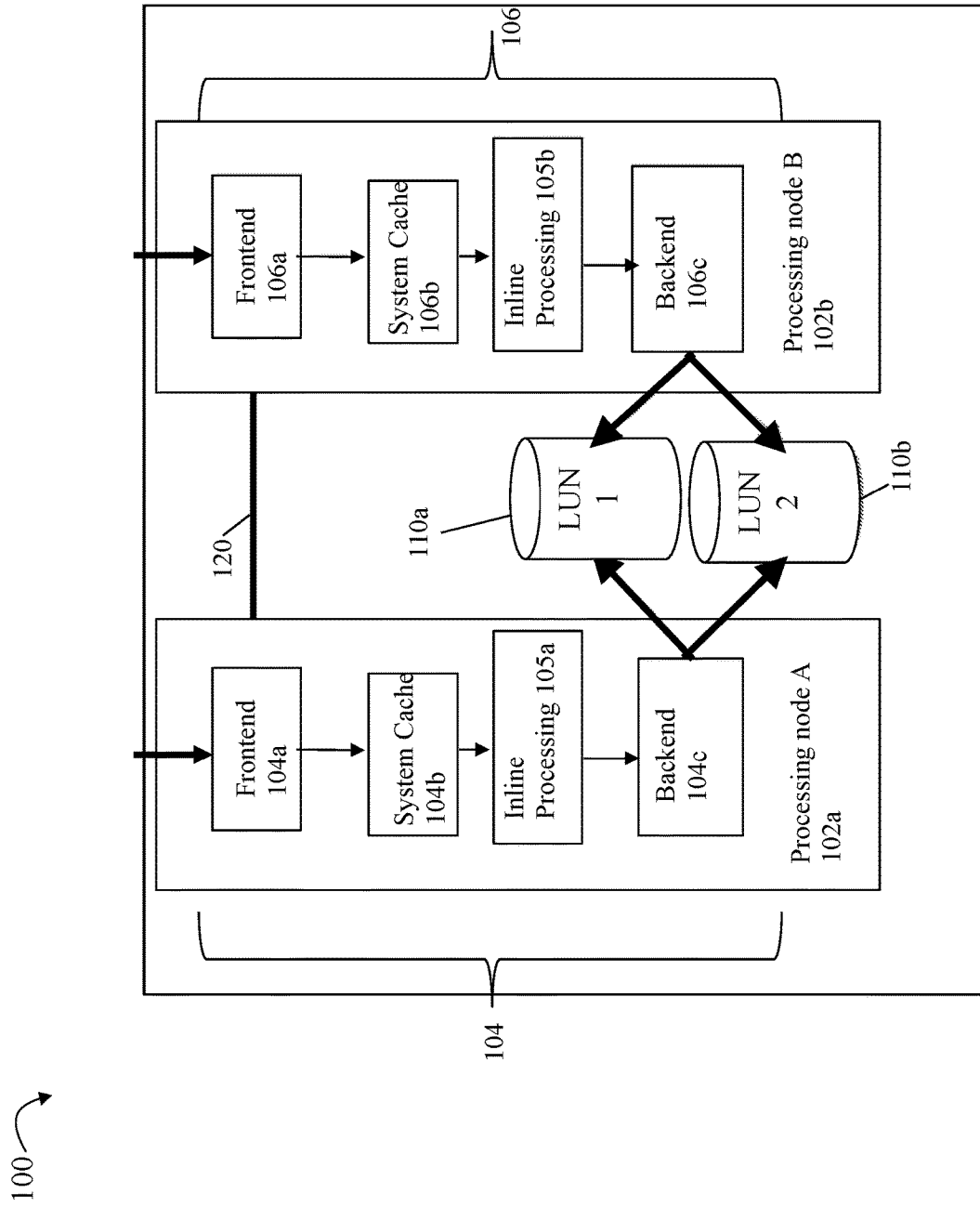
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 100, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and BE component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache (e.g., cache hit or read cache hit), the read data block is retrieved from the system cache 104b and returned to the host. Otherwise, if the requested read data block is not in the system cache 104b (e.g., cache miss or read cache miss) but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a log or journal can be used for recording writes and possibly other information. In one system, the log can be implemented using one or more logging devices that can be shared by both nodes of the dual node architecture. In at least one embodiment, the logging devices can be external with respect to the two nodes and the logging devices can be non-volatile PDs accessible to both nodes. Besides the one or more logging devices, the embodiment can include additional BE PDs that provide the BE non-volatile storage for the nodes where the recorded operations stored in the log (e.g., on the log devices) are eventually flushed to the BE PDs as discussed elsewhere herein.

In at least one embodiment, in addition to such a persistently stored log or journal, one or more of the nodes can also include node-local in-memory copies of information of the log. In at least one embodiment, the node-local in-memory copies of information of the log stored on each node can be stored in volatile memory, such as a RAM, that is local to the node and accessed only within the node. For example, a process or thread of code executing on a core or processor of the node can access for reading and/or writing the RAM or other volatile memory that is local to the node.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log or journal can be used to optimize write operation latency. Generally, the write operation writing data is received by the data storage system from a host or other client. The data storage system then performs processing to persistently record the write operation in the log or journal. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques herein is provided below.

Figure 3:
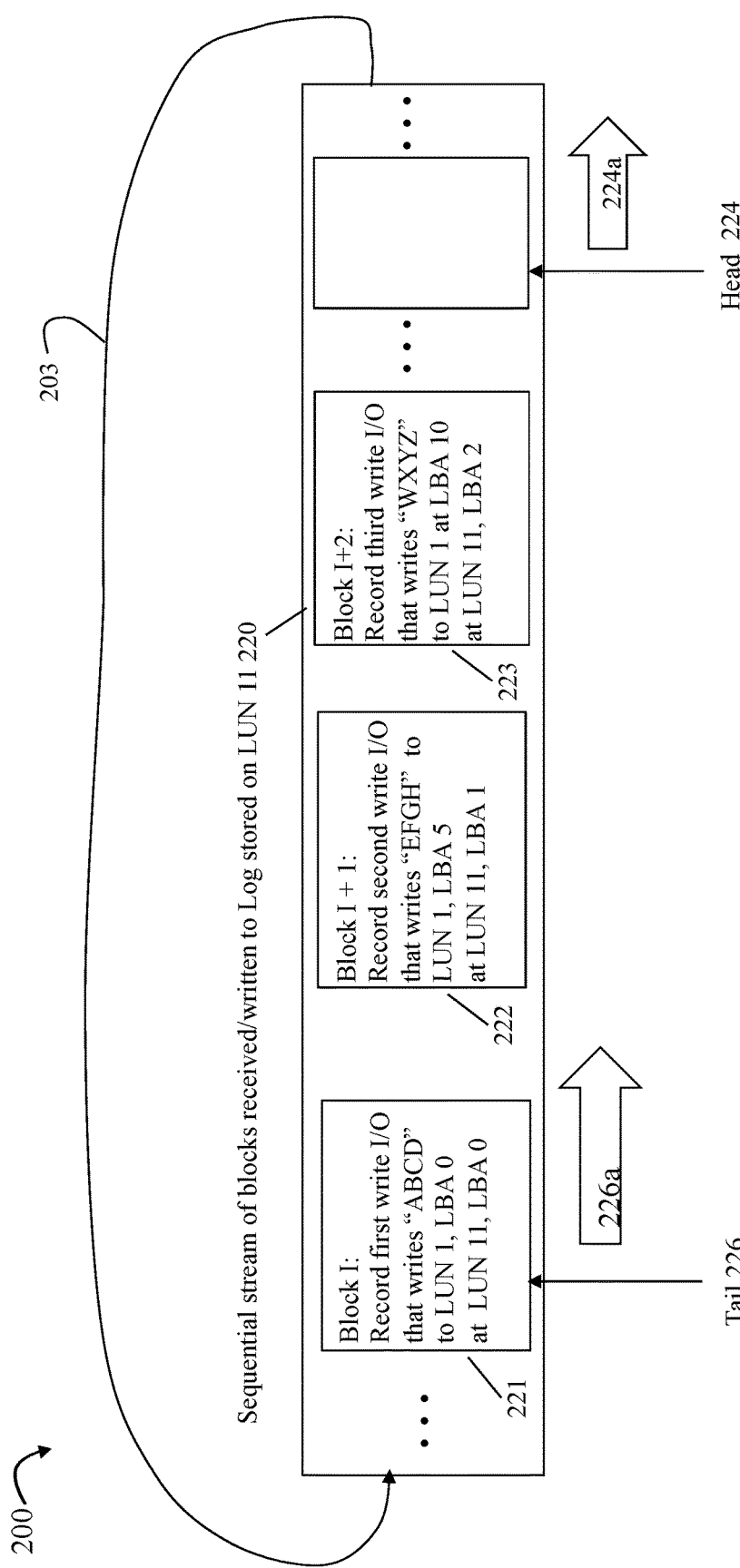
FIGS. 3, 4, 5 and 6 are examples illustrating use of a log structured system in an embodiment in accordance with the techniques of the present disclosure.

Referring to FIG. 3, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224*a* to the next record or log in the log as each next write I/O operation is recorded. When the head pointer 224 reaches the end of the log by writing to the last sequential block or record of the log, the head pointer can advance 203 to the first sequential block or record of the log in a circular manner and continue processing.

The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer can advance 203 to the first sequential block or record of the log in a circular manner and continue processing. Thus, the circular logical manner in which the records or blocks of the log are processed form a logical ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described in more detail in the following paragraphs. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 4:
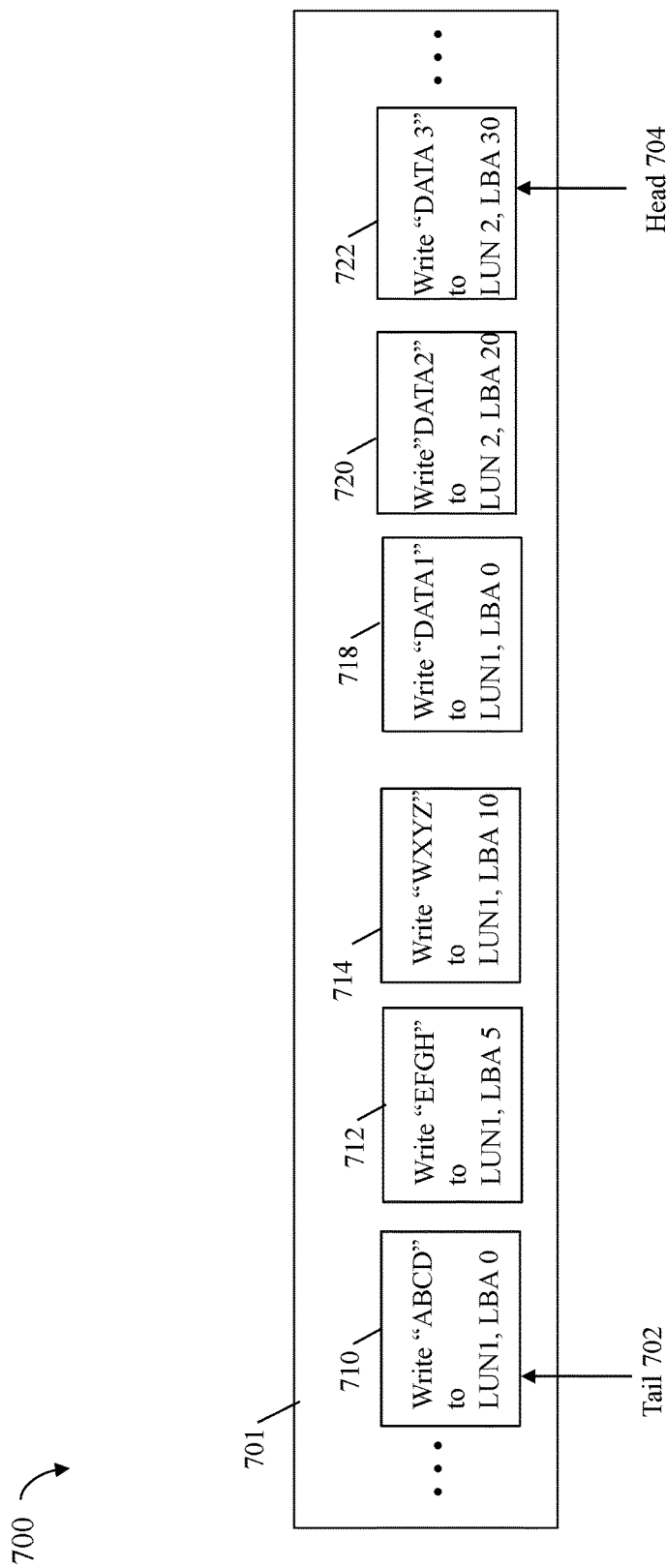

Referring to FIG. 4, shown is an example of information that can be included in a log 701 in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 can also record the write data (e.g., write I/O operation payload) written by the write operations.

It should be noted that the log records 710, 712 and 714 of FIG. 4 correspond respectively to the log records 221, 222 and 223 of FIG. 3.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. Such constraints can consider any possible data dependencies between logged writes (e.g., two logged writes that write to the same logical address) and other logged operations in order to ensure write order consistency.

Figure 5:
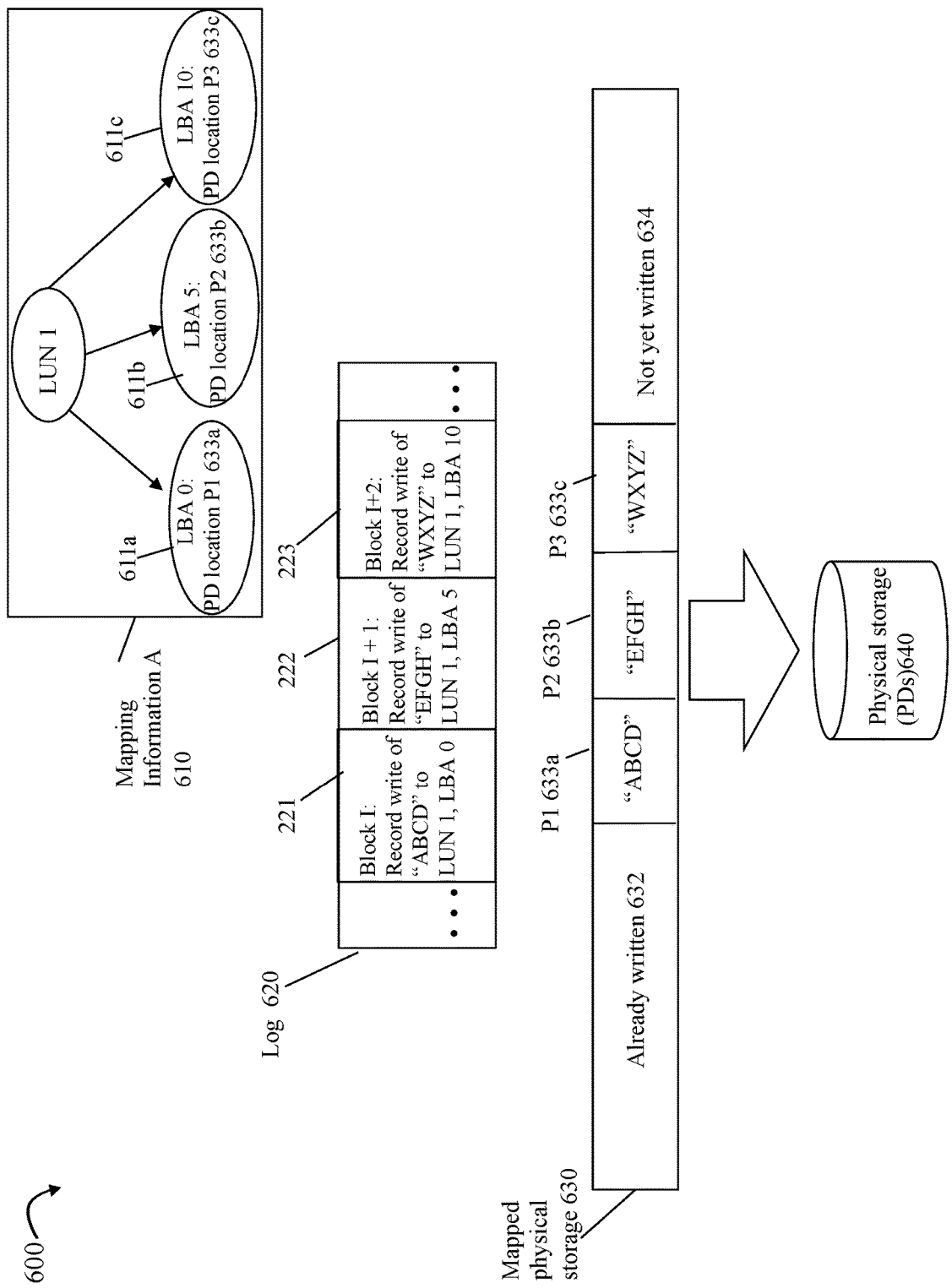

Referring to FIG. 5, shown is an example 600 illustrating the flushing of logged writes and the physical data layout of data on BE PDs in at least one embodiment in accordance with the techniques of the present disclosure. FIG. 5 includes the log 620, the mapping information A 610, and the physical storage (i.e., BE PDs) 640. The element 630 represents the physical layout of the data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which data, such as written user data, can be stored and written to the physical storage 640 as the log records or blocks are flushed. In this example, the records of the log 620 can be flushed and processing sequentially (e.g., such as described in connection with FIG. 3) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223. Generally, data from multiple log entries of the log 620 can be combined into a larger chunk that is written out to physical storage of the BE PDs.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the flushed log data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630. In at least one embodiment, modifications to metadata including mapping information used by the data storage system can also be recorded in the log 620 and flushed to the mapped physical storage 630, and thus the BE PDs 640, in a manner similar to that as described herein for the written user data which can include data written by host-based writes.

Consistent with other discussion herein, the mapped physical storage 630 can correspond to the BE PDs providing BE non-volatile storage used for persistently storing user data as well as metadata, such as the mapping information. With a log structured system as discussed herein, as recorded writes in the log are processed, the data written by the writes can be written to new sequential physical storage locations on the BE PDs. Thus, with a log structured system, the data and associated metadata can be written sequentially to the log 620 and also can be written sequentially to the mapped physical storage 630. Thus, one characteristic of log structured systems (LSSs) is that updates do not overwrite the existing copy, such as of user data written by a write operation. Rather, the updated or new data written at a target logical address can be stored at a next sequential location in the log and also in a next sequential physical storage location on the BE PDs. In an LSS of the data storage system in at least one embodiment, the physical storage 630 denoting the physical storage of the BE PDs can also be implemented and managed as a logical circular log in a manner similar to that as described in connection with the log of FIGS. 3, 4 and 5 containing the data prior to being flushed to the physical storage 630 of the BE PDs. As a recorded write operation that writes write data to a particular logical address, such as a LUN and LBA, is flushed from an entry of the log 620, mapping information that maps the particular logical address to the physical storage location including the write data or content stored at the particular logical address can be accordingly updated.

Figure 6:
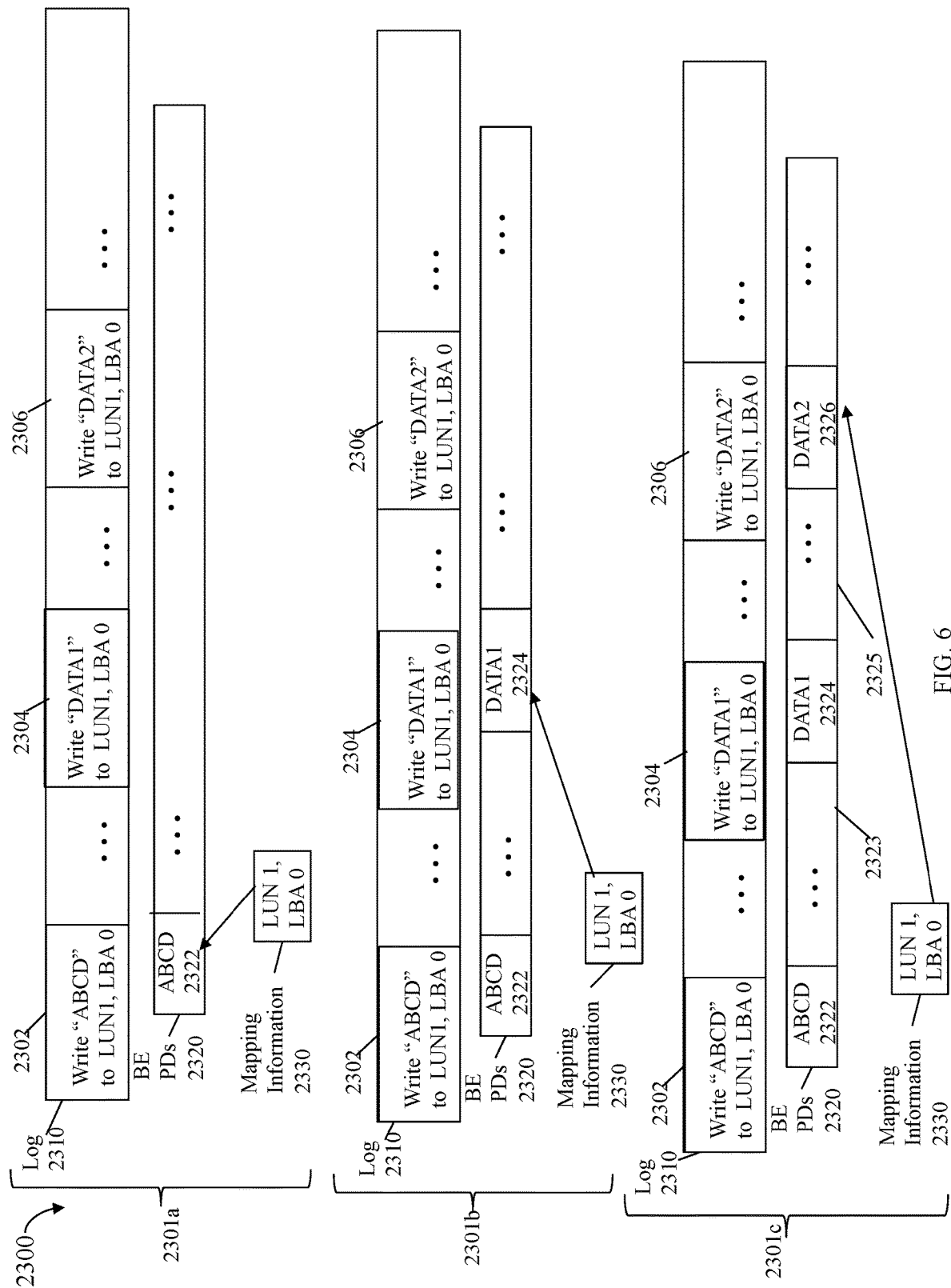

For example with reference to FIG. 6, the element 2301a can denote the state of the log file 2310, BE PDs 2320 and mapping information 2330 at a first point in time T1 after processing the record 2302 for a first write of "ABCD" to the logical address LUN A, LBA 0. The data written "ABCD" by the recorded write of 2302 can be stored at the BE PD location 2322. Thus, flushing the log record 2302 results in storing the write data "ABCD" to the BE PD location 2322 and additionally updating the mapping information 2330 to reference the BE PD location 2322. The mapping information 2330 denotes the metadata used to map the logical address LUN 1, LBA 0 to the current physical location on the BE PDs containing the user data or content stored at the logical address LUN 1, LBA 0. After the log record 2302 is flushed from the log 2310, the record 2302 is available and can be subsequently reclaimed for reuse for logging other operations in the log 2310.

At a second point in time T2 subsequent to T1, the log record 2304 can be processed and flushed to the BE PDs 320. The element 301b denotes the state of the log file 2310, BE PDs 2320 and mapping information 2330 at the second point in time T2 after processing the record 2304 for a second write of "DATA1" to the logical address LUN A, LBA 0. The data written "DATA1" by the recorded write of 2304 can be stored at the BE PD location 3224. Thus, flushing the log record 2304 results in storing the write data "DATA1" to the BE PD location 2324 and additionally updating the mapping information 2330 to reference the BE PD location 2324 denoting the physical location containing the data stored at the LUN 1, LBA 0 at the time T2. Additionally, the PD location 2322 can be invalidated since it no longer contains valid current data for the logical address LUN 1, LBA 0, whereby the PD location 2322 can be available for reuse. After the log record 2304 is flushed from the log 2310, the record 2304 is available and can be subsequently reclaimed for reuse for logging other operations in the log 2310.

At a third point in time T3 subsequent to T2, the log record 2306 can be processed and flushed to the BE PDs 2320. The element 2301c denotes the state of the log file 2310, BE PDs 2320 and mapping information 330 at the third point in time T3 after processing the record 2306 for a third write of "DATA2" to the logical address LUN A, LBA 0. The data written "DATA2" by the recorded write of 2306 can be stored at the BE PD location 2326. Thus, flushing the log record 2306 results in storing the write data "DATA2" to the BE PD location 2326 and additionally updating the mapping information 2330 to reference the BE PD location 2326 denoting the physical location containing the data stored at the LUN 1, LBA 0 at the time T3. Additionally, the PD location 2324 can be invalidated since it no longer contains valid current data for the logical address LUN 1, LBA 0, whereby the PD location 2324 can be available for reuse. After the log record 2306 is flushed from the log 2310, the record 2306 is available and can be subsequently reclaimed for reuse for logging other operations in the log 2310.

It should be noted that the flushing of the log can be performed in response to an occurrence of any one or more defined conditions. For example, the log can be flushed in response to determining that the amount of reclaimed log space available for use and allocation is less than a specified threshold amount or size.

Consistent with discussion above, the mapping information (sometimes referred to as a mapping structure, metadata structure or simply metadata (MD)) can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location on the BE PDs containing the content or data stored at the logical address. In at least one embodiment, the mapping information includes a MD structure that is hierarchical structure of multiple layers of MD pages or blocks.

In at least one embodiment, the mapping information or structure for a LUN, such as LUN 1 described above in connection with FIGS. 3, 4, 5 and 6, can be in the form of a tree having a plurality of levels of MD pages. More generally, the mapping structure can be in the form of any ordered list or hierarchical structure. In at least one embodiment, the mapping structure for a LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes.

With a log-structured system in at least one embodiment, as recorded writes of the log are processed and flushed or destaged to the BE PDs, the content written by the recorded writes of the log can be stored at physical storage locations on the BE PDs. Additionally, the MD or mapping information corresponding to the logged writes being flushed can also be accordingly updated to reference the physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure. In at least one embodiment, content recorded persistently in the log can also be stored in volatile memory cache of each node. When write data is flushed by a node, it can be flushed from the log and the volatile memory cache of the node. In at least one embodiment, write data can remain in the volatile memory cache of the node while the write data is in the log and has not yet been flushed from the log to BE non-volatile storage.

A data storage system can provide different data replication technologies, facilities or services. Such replication technologies can be characterized as local or remote. Additionally, a replication technology can provide for creating a complete, physical bit for bit copy of data (that is local and/or remote). A replication technology can provide for creating a logical or virtual point in time copy of a data source such as using a snapshot technology or facility known in the art. Such logical copies of a data source are not a complete physical copy of the data source. Rather, different techniques such as a snapshot technique can be used to create a logical or virtual copy of the data source. For example, a snapshot facility can be used to create a snapshot characterized as a logical point in time copy of data. In connection with a logical device, or more generally any storage object or entity, software of a data storage system can provide one or more data replication services or facilities whereby a snapshot is one such facility that can be used to create point in time snapshot of a logical device such as a LUN for non-disruptive backup. A snapshot can appear like a normal logical device and can be used for backup, testing, and the like. The snapshot facility can be characterized as a local replication facility or service that takes snapshots of storage objects in a single data storage system. A local replication facility can be contrasted with a remote replication facility that provides for remote replication of storage objects from a source site or data storage system to a remote site or data storage system. Remote replication facilities provide remote copies of the storage objects for use in connection with data unavailability or disaster of the source site.

Snapshots can rely, for example, on copy on first write (COFW) and other techniques to track source logical device changes from the time when a snapshot was created. Any writes to the source logical device may result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device may be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device can be contrasted, for example, with the physically complete bit-for-bit replicas of the source logical device.

In connection with the foregoing, COFW is only one example of a technology or a technique that can be used in connection with snapshots. More generally, any suitable technique can be used in connection with snapshot creation and techniques described herein. As another example, redirect on Write (ROW) is another technique that can be used in connection with a snapshot implementation. With ROW, after a snapshot is taken, new writes to the primary or source logical device are redirected (written) to a new location.

A data storage system can also provide a remote replication facility that automatically replicates a storage object or entity of a first or source data storage system to a second or remote data storage system. Such remote replication can be performed in an ongoing continuous manner with respect to changes made over time to the storage object of the source system. Consistent with other discussion herein, the storage object of a replication service or facility, both local and remote, can be, for example, a logical device or LUN, a file, file system, and the like. A remote replication facility can automatically mirror or replicate all writes performed to the source storage object on the first system to a duplicate target storage object on the remote second data storage system. In connection with source and target storage objects that are logical devices, the source and target logical devices can be configured to have the same identity (from the perspective and use of the host or other storage client), as well as the same size or capacity as well as have other matching characteristics in order to have the target logical device be identified to the host as the same logical device as the source logical device. In this manner, the target logical device on the second or target data storage system can be used in the event of data unavailability or a disaster at the first data storage system. Generally, each logical device of the source system can be similarly configured for replication on the target system.

In at least one embodiment, the remote replication facility can provide one or more supported replication modes such as asynchronous remote replication and synchronous remote replication. With remote replication, the source system can receive a write to a source storage object configured to have a corresponding target storage object on the remote or target system.

The write data can be stored on the source system, such as recorded in the log and cache, and then later destaged or written out, such as from the cache, to a physical location on the backend PDs of the source system provisioned for the source storage object. With asynchronous remote replication, an acknowledgement regarding completion of the write I/O operation can be returned to the host or other client that originated the write I/O operation once the write data of the write I/O operation has been stored in the cache and log of the source system. With synchronous remote replication, an acknowledgement is not returned to the host or other client that originated the write I/O operation until the target system has acknowledged receipt of the replicated write I/O operation on the target system. With remote replication, the write data is transferred from the source system to the remote target system for replication on the target storage object. Responsive to receiving the write data transferred from the source system to the remote target system, the write data can be stored in a log and cache of the target system. At a later point in time, the write data can destaged or written out from the cache of the target system to a physical location on the BE PDs of the target system provisioned for the target storage object. The target system can send an acknowledgement regarding successful completion of the write I/O operation on the target system once the data written by the write operation has been stored in the log and cache of the target system. With synchronous replication, the host or other client originating the write I/O operation can be sent an acknowledgement regarding completion of the write I/O operation responsive to the source system receiving the foregoing acknowledgement regarding successful receipt of the replicated write I/O operation from the target system. Asynchronous replication mode can be preferred for longer distances between the source and target systems to minimize time outs occurring on an external host waiting to receive the acknowledgement from the source system regarding completion of the write I/O operation.

In at least one data storage system, remote data replication (also referred to as remote replication) is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as a the asynchronous and synchronous modes described above.

In at least one existing data storage system, the remote replication can be performed by a remote replication facility executing on the source system where the remote replication facility can use a technique referred to as a snapshot difference or snap diff technique. The snap diff technique provides for taking two successive snapshots of the logical device or other storage object on the source system that is replicated on the target system, and then determining the data difference with respect to the two successive snapshots. The data difference denotes the data blocks that have been written or modified in the time interval from a first point in time to a second later point in time, where a first snapshot is taken at the first point in time and a second successive snapshot is taken at the second point in time. The time interval may correspond, for example, to a recovery point objective (RPO) defined as the maximum amount of allowable data loss, as measured by time, that can be lost after a recovery from a disaster, failure, or comparable event before data loss will exceed what is acceptable to an organization. The snap diff technique can provide for taking a snapshot at each RPO interval. For example, for an RPO of 5 hours, a snapshot of the logical device can be taken on the source system every 5 hours and compared to the immediately prior snapshot to determine the data differences including data blocks that have been modified since the immediately prior snapshot. The data differences including the modified or newly written data blocks of the logical device are then transferred from the source system to the target system and applied to the remote copy of the logical device on the target or remote system.

The snap diff technique, and more generally creating and use snapshots, can be characterized as expensive generally having significant processing overhead. For example, in one embodiment of remote replication using the snap diff technique, creating a snapshot can include enforcing barriers used to denote points in time between writes where the writes between two such barriers can denote the writes included in a particular snapshot instance. In such an embodiment in which writes from a log are flushed to backend (BE) non-volatile storage, the recorded writes in the log between two barriers can denote the recorded writes of the log for a single snapshot. In some systems, flushing of recorded writes of the log can occur in parallel by multiple flushing threads. Additional dependencies and overhead can be incurred when enforcing such barriers and when synchronizing and flushing the log records by the multiple flushing threads. In at least one system, snapshot creation can also require allocating new metadata pages used with the snapshot. Additionally, once a particular snapshot used with replication is no longer needed, additional processing overhead can be incurred in connection with other operations such as deleting the snapshot.

High processing costs can be incurred in connection with accessing data on the source system that is to be replicated to the target system, for example, in the event of a cache miss with respect to the data to be replicated. Replication processing on the source system can replicate write data stored in the cache. If the write data is not stored in the cache at the time needed for the replication processing, a cache miss occurs and the write data (denoting a modified data portion or block) is then accessed from the BE non-volatile storage. For example, in at least one system, the write data can remain in the cache until it is flushed from the log to the BE non-volatile storage. On the source system, snapshots can be created in connection with the snap diff technique with respect to a storage object, such as a logical device, while also flushing the write data stored in the cache for the same logical device. In some instances, the write data can be flushed from the cache and log before the write data has been replicated to the remote target system. In this case, when the time arrives to replicate the write data from the source system to the remote system, replication processing on the source system experiences a cache miss with respect to the write data and must then read the write data from the BE non-volatile storage. Reading the write data from the BE non-volatile storage can be an expensive processing operation as compared to reading the write data from the cache. For example in at least one existing system, accessing the write data on the BE non-volatile storage can require reading multiple layers of mapping information to identify the particular storage location of the write data on the BE non-volatile storage. Additionally, cache misses can result when attempting to read the foregoing mapping information since the mapping information is also required to be in cache in order to be read and used to identify the storage location of the write data on the BE non-volatile storage.

To overcome the foregoing drawbacks, described in the following paragraphs are techniques used to provide efficient data replication using a replication log on the source system. The replication log can denote write or modified data which has been flushed but which still needs to be replicated from the source system to the target system. The replication log can facilitate accessing the write or modified data in an efficient manner without using the mapping information. In at least one embodiment, the techniques can be used for efficient asynchronous replication of data with a high RPO and minimal performance impact. In at least one embodiment, the techniques of the present disclosure can be performed without using the expensive snap diff on the source system and with the source system omitting expensive processing to actually construct a snapshot including its associated metadata structures. In at least one embodiment, the techniques of the present disclosure can be performed without using the expensive snap diff technique and without actually creating a snapshot with all its required metadata on the source system. In at least one embodiment, semantics associated with the snapshot, such as checkpoint or barrier records of the transaction log, replication log and replication queue, can be used to specify snapshot semantics such as, for example, for transactional write consistency across one or more LUNs, without actually constructing the metadata and other structures implementing the snapshot on the source system.

The foregoing and other aspects of the techniques of the present disclosure are described in more detail in the following paragraphs.

Figure 7:
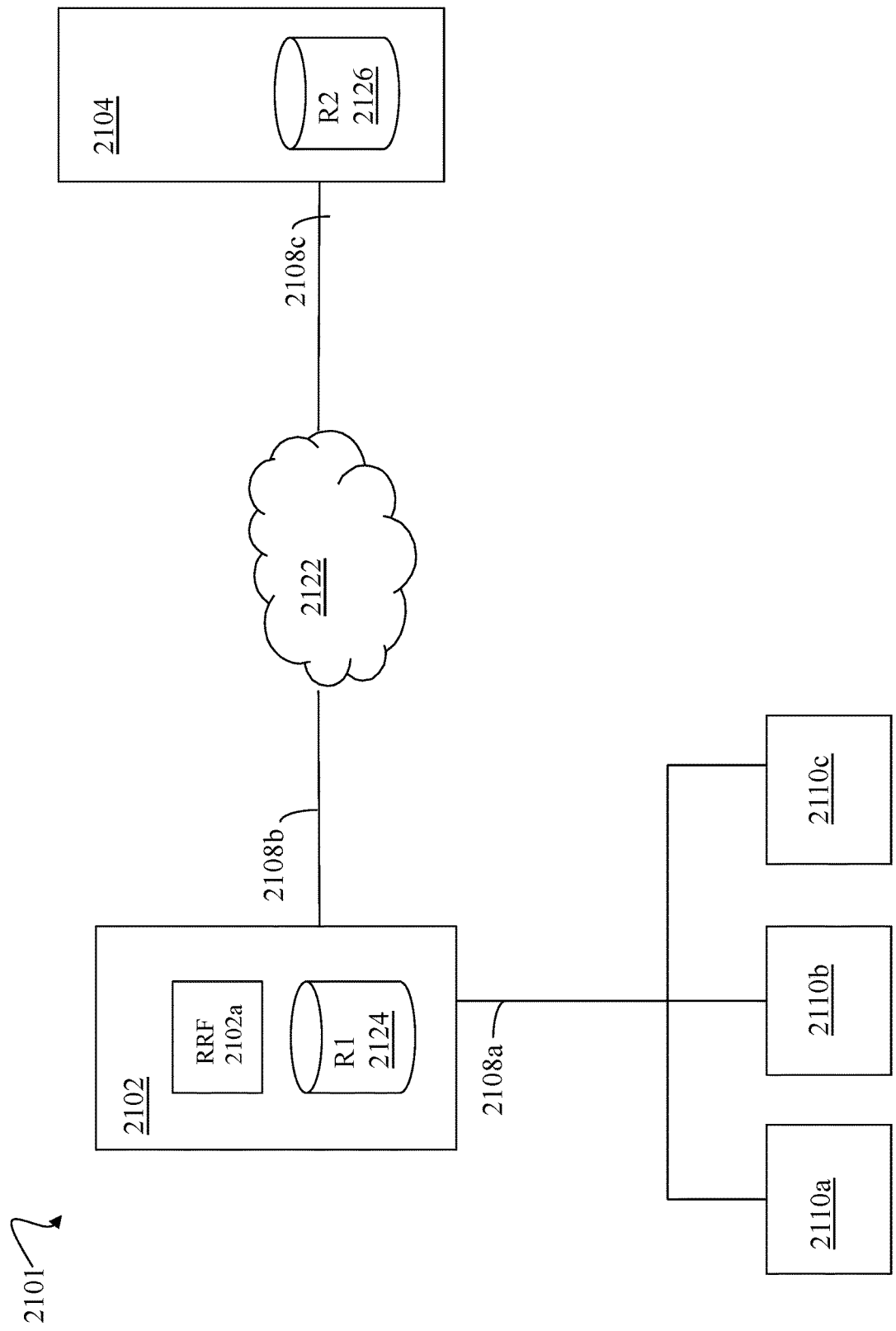
FIG. 7 is an example illustrating a configuration of systems in connection with performing remote replication in at least one embodiment in accordance with the techniques of the present disclosure.

Referring to FIG. 7, shown is an example 2101 illustrating remote data replication in at least one embodiment in accordance with the techniques of the present disclosure. It should be noted that the embodiment illustrated in FIG. 7 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 can be remotely connected and communicate over the network 2122, such as the Internet or other private network, and facilitate communications with the components connected thereto. The hosts 2110a, 2110b and 2110c can perform operations to the data storage system 2102 over the connection 2108a. The hosts 2110a, 2110b and 2110c may be connected to the data storage system 2102 through the connection 2108a which can be, for example, a network or other type of communication connection.

The data storage systems 2102 and 2104 can include one or more devices. In this example, the data storage system 2102 includes the storage device R1 2124, and the data storage system 104 includes the storage device R2 2126. Both of the data storage systems 2102, 2104 can include one or more other logical and/or physical devices. The data storage system 2102 can be characterized as local with respect to the hosts 2110a, 2110b and 2110c. The data storage system 104 can be characterized as remote with respect to the hosts 2110a, 2110b and 2110c.

The host 1210a can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF) 2102a. In operation, the host 110a can read and write data using the R1 volume in 2102, and the RRF can handle the automatic copying and updating of data from R1 to R2 in the data storage system 2104. Communications between the storage systems 2102 and 2104 can be made over connections 2108b, 2108c to the network 2122.

The R1 and R2 devices can be configured as LUNs. For example, R1 and R2 can be configured to have the same LUN identity from the perspective of hosts 2110a-c. For example, R1 can be the primary copy of a LUN, such as LUN A, for which a backup copy is made using remote replication to the R2 device, also configured as the same LUN A. In the event of a disaster where R1 is destroyed or unavailable and the hosts have to continue issuing I/Os using the R2 device, the hosts can continue issuing I/Os to the same LUN A using R2.

The RRF 2102a can be configured to operate in one or more different supported replication modes such as, for example, the synchronous mode and the asynchronous mode, as discussed above. Consistent with other discussion herein, when operating in the synchronous mode, the host does not consider a write I/O operation to be complete until the write I/O has been completed on both the first and second data storage systems. Thus, in the synchronous mode, the first or source storage system 2102 will not provide an indication to the host that the write operation is committed or complete until the first storage system 2102 receives an acknowledgement from the second remote or target data storage system 2104 regarding receipt of the replicated write by the second data storage system. In contrast, in connection with the asynchronous mode, the host receives an acknowledgement from the first data storage system 2102 as soon as the information is stored, such as in the cache and log, on the first data storage system 2102 without waiting for the acknowledgement of the replicated write from the second data storage system 2104.

With synchronous mode remote data replication, a host 2110a can issue a write to the R1 device 2124. The primary, source or R1 data storage system 2102 may record the write data in its log as discussed, for example, in connection with FIGS. 3-6, and also in the cache of the source system 2102. The RRF operating in the synchronous mode can propagate the write data across an established connection or link (more generally referred to as the remote replication link or link) such as over 2108b, 2122, and 2108c, to the target, secondary or R2 data storage system 2104 where the write data can be stored in the log and cache of the system 2104. Once the write data is stored in the log and cache of the system 2104, the R2 data storage system 2104 can return an acknowledgement to the R1 data storage system 2102 that it has received the write data. Responsive to receiving this acknowledgement from the R2 data storage system 2104, the R1 data storage system 2102 can return an acknowledgement to the host 2110a that the write has been received and completed. With synchronous replication, the R1 device 2124 and the R2 device 2126 are fully mirrored but can result in a high I/O latency and response time (e.g., since the I/O latency and response time includes the time needed to replicate the write data from the source to the target system and also return an acknowledgement from the target to the source system regarding receipt of the write data). Generally, synchronous replication can be performed with a replication link or connection between the systems 2102 and 2104 that is reliable and has a high transmission speed.

With asynchronous replication mode, the R1 system 2102 can return the acknowledgement to the host 2110a regarding completion of the write immediately after the R1 system 2102 has stored the write data in its log and cache. In this manner with asynchronous replication, the R1 system 2102 does not wait for the return acknowledgement from the R2 system 2104 before returning the acknowledgement of write completion to the host 2110a. With asynchronous replication, there is always some time lag and thus a data difference or delta between the R1 device 2124 and the R2 device 2126. With asynchronous replication, the R2 device 2126 of the R2 system 2104 always lags behind the R2 device 2124 of the R1 system 2102 by some portion of the most recent data updates defined by the granularity of the replication. Asynchronous replication, in comparison to synchronous replication provides lower I/O latency and lower I/O response time and is much less sensitive to the replication link quality and transmission speed.

Generally, the R1 device 2124 and R2 device 2126 can be logical devices, such as LUNs, configured to have the same LUN identity to the host or other storage client. The R1 and R2 devices can be, for example, fully provisioned LUNs, such as thick LUNs, or may be LUNs that are thin or virtually provisioned logical devices.

In at least one embodiment, the techniques of the present disclosure can be used in connection with the RRF 2102a performing asynchronous replication as described above, for example, in connection with FIG. 7 with remote replication operating in the asynchronous replicate mode. Additionally, in at least one embodiment, the systems 2102 and 2104 can be log based systems which record writes in the log of the respective systems, for example, as described in connection with FIGS. 3-6. In such systems, write data can be record in the log and also stored in the cache. Subsequently, the write data can be flushed from the log to the BE PDs. In such systems in at least one embodiment, data written to the BE PDs can be copied from cache whereby, when flushing the write data from the log, the cached copy of the write data can be flushed from the cache to the BE PDs. Generally, consistent with other discussion herein, data can be written to and read from a BE PD utilizing a cache or caching layer. BE read operations read data from the BE PDs and store the read data in the cache, and BE write operations write data from the cache to the BE PDs.

In at least one embodiment using the techniques of the present disclosure, asynchronous replication of the R1 device 2124 of the R1 system 2102 to the R2 device 2126 of the R2 system 2104 can be performed in an ongoing continuous manner while, in parallel, one or more storage system clients, such as one or more of the external hosts 2110a-c, continue to issue read and write operations to the R1 device 2124 of the R1 system 2102.

Remote replication is illustrated in FIG. 7 with respect to a single object, such as single source LUN denotes as the R1 device 2124 having a corresponding remote counterpart LUN denotes as the R2 device 2126. In some instances, write consistency and dependency can be preserved with respect to consistency group (CG) identifying a group of storage resources or objects, such as two or more LUNs, which operate in unison to preserve the integrity and dependent write consistency of data distributed across all LUNs of the CG. Thus, write consistency can be maintained across and with respect to all LUNs (or more generally all resources or objects) of CG whereby, for example, all members of the CG denote a copy of data with respect to a same point in time. In at least one embodiment, a CG can be a set of LUNs which are replicated together for which write order fidelity is preserved. A CG can be used, for example, in connection with a write transaction that performs multiple writes to two or more LUNs of the same CG. It can be required for certain applications, such as a database application, which issues the multiple writes of the write transaction to two or more LUNs for all such multiple writes of the single write transaction to be applied atomically across the two or more LUNs of the CG. In this manner from the client application view point, the content of the LUNs of the CG need to reflect application of all writes of the entire write transaction, or otherwise have content in which none of the writes of the write transaction are applied to the LUNs of the CG. In connection with a snapshot taken at a point in time, a single snapshot can include all writes of the single write transaction in order to reflect and maintain the write consistency of the write transaction across the two or more LUNs of the CG. In at least one embodiment, the multiple writes of the single transaction to multiple LUNs of the CG can be included in the same single snapshot. In at least one embodiment recording writes in a log as described, for example, in connection with FIGS. 3-6, the multiple writes can be between two checkpoints. In this manner in at least one embodiment, a checkpoint can denote a boundary in the log in connection with writes included in a single snapshot. More generally, writes in the log between two successive checkpoints can denote writes applied across one or more LUNs to maintain any desired write consistency with respect to the one or more LUNs. Writes in the log between two successive checkpoints can denote semantics for writes included in the same snapshot. Writes not within the same two successive checkpoints or writes that cross checkpoints or boundaries denote writes in different snapshots.

In at least one embodiment, writes recorded, such as in the log, between two checkpoints or barriers can denote the writes made to LUNs in a CG providing a transactionally consistent view across all LUNs of the CG. Thus in such an embodiment, all writes between the two successive checkpoints can be applied atomically to the LUNs of the CG to provide a transactionally consistent view with respect to multiple writes of each single transaction.

In at least one embodiment in accordance with the techniques of the present disclosure, use of the snap diff technique by the source R1 system 2102 can be avoided or omitted. Generally, the snapshot is one technique or tool that can be used to provide any needed synchronization and consistency to provide a transactionally consistent view across a CG. As discussed in more detail, the techniques of the present disclosure can provide for a transactionally consistent view across all LUNs of the CG using semantics of checkpoint records represent checkpoint commands without having the source R1 system 2102 use the snap diff technique and without the R1 system 2102 instantiating or creating a snapshot.

In at least one embodiment, the source or R1 system 2102 can utilize the techniques of the present disclosure for asynchronous remote replication. In at least one embodiment, the destination or remote R2 system 2104 can continue to utilize an existing legacy technique. For example, in at least one embodiment, the R2 system 2104 can continue to create and use successive snapshots based on replicated write data received from the R1 system 2102. For example, writes made to the R1 device 2124 can be replicated from the R1 system 2102 to the R2 system 2104. The writes can generally be included in a logical stream denoting a time order in which the writes (made to the R1 device) are to be applied to the R2 device 2124. The logical stream can also include checkpoint command records each denoting a checkpoint in the stream such that replicated writes/replicated write data can be included between pairs of successive checkpoint records in the stream. The R2 system 2104 can create multiple single snapshots each including all replicated writes between a pair of two successive checkpoints in the stream where such replicated writes were made to the R1 device 2124 and are now to be applied to the R2 device 2126. More generally, the logical stream can include writes directed to multiple LUNs of a CG, where the logical stream can include more than two checkpoints thereby denoting writes incorporated by the R2 system 2104 into two or more snapshots. Generally, the writes between two successive checkpoint records such as in the logical stream sent to the R2 system can denote barriers which can be used, for example, to create snapshots on the R2 system, and more generally, to provide semantics for transactional write consistency (e.g., where the checkpoints can denote the bounds or barriers of a write transaction for which all writes between two successive checkpoints can be applied).

In at least one embodiment in which there are no CGs, or more generally, where there is not such write dependencies among multiple LUNs or other objects (e.g., no write transaction consistency across multiple LUNs or objects), the replicated writes received at the R2 system 2104 from the source R1 system 2102 can be directly applied to the remote R2 LUNs or other objects on the system 2104 without the need for utilizing snapshots or other techniques to synchronize and apply the replicated writes in a transactionally consistent manner. In such an embodiment, the stream of replicated writes received at the R2 system 2104 may not include any checkpoint or barrier records.

In at least one embodiment in accordance with the techniques of the present disclosure, write data of write operations recorded in the log can be guaranteed to be in the cache until such recorded write operations are flushed from the log. After the record of a write operation is flushed from the log, the write data of the write operation can be evicted or removed from the cache, for example, such as based on the particular cache management and eviction policy of the cache. The write data may, for example, remain in the cache for some amount of time subsequent to the associated write operation record being flushed from the log. The log, such as described in connection with FIGS. 3-6 to record write operations, can also be referred to herein as a transaction log.

In at least one embodiment on the source R1 system 2102, the techniques of the present disclosure can maintain and utilize a replication log that tracks write data and/or write operations having corresponding records of the transaction log that have been flushed from the transaction log but where such write data has not yet been replicated to the R2 system 2104.

In at least one embodiment, the replication log can be characterized as a dedicated replication log used for the dedicated task of tracking write data and/or write operations having corresponding records of the transaction log that have been flushed from the transaction log but where such write data/write operations have not yet been replicated to the R2 system 2104. In at least one embodiment, the replication log can be stored persistently such as, for example, on a form of non-volatile storage. For example, the replication log can be stored on non-volatile RAM storage of the source R1 system 2102. In at least one embodiment in which the source R1 system 2102 includes multiple tiers of non-volatile storage including the non-volatile RAM storage as well as one or more non-volatile SSDs such as flash-based PDs, the replication log can be stored in the non-volatile RAM storage and demoted to a slower non-volatile tier such as a tier of the non-volatile SSDs as may be needed. In at least one embodiment, the replication log can include direct pointers or addresses to write data as stored in storage locations on the BE PDs. In this manner, the replication log of the source R1 system can be used to directly and efficiently access the write data which has been flushed from the log and which can be removed or evicted from cache prior to being replicated. The direct pointers or addresses of the replication log can be used to directly and efficiently retrieve such write data from the BE PDs and store the write data in the cache as needed during replication processing without performing more expensive operations to access the write data from the BE PDs using the mapping information or metadata. In at least one embodiment, the replication processing can retrieve the write data to be replicated from the cache. Thus, replication processing on the source R1 system 2102 in such an embodiment needs the write data to be stored in the cache of the source R1 system 2012 in order for the source R1 system 2102 to proceed with replicating the write data to the remote destination R2 system 2104.

In at least one embodiment, the techniques of the present disclosure do not perform the snap diff technique on the source R1 system 2102. In at least one embodiment, the replication log of the source R1 system 2102 can track writes and the associated write replication order denoting the logical order in which the writes are to be applied to remote counterpart R2 LUNs or objects on the R2 system 2104.

In at least one embodiment, the techniques of the present disclosure as used in connection with the replication log on the source R1 system 2102 allow for flexibility with respect to techniques used by the remote destination R2 system 2104 to apply the received replicated writes to the R2 LUNs or other objects. Put another way, the R2 system 2104 can be unaware of whether the R1 system 2102 uses the techniques of the present disclosure or the snap diff technique. In at least one embodiment, the R2 system 2104 can form and build snapshots from the received replicated writes from the R1 system 2102. In at least one embodiment, the R2 system 2104 can maintain and/or apply the writes of individual snapshots to corresponding R2 LUNs or objects of the R2 system 2104. In at least one embodiment, the R2 system 2104 can use the replicated checkpoint command records to apply writes across one or more LUNs in a transactionally consistent manner.

What will now be described are data structures and related processing that can be performed on the source R1 system in at least one embodiment in accordance with the techniques of the present disclosure.

Figure 8:
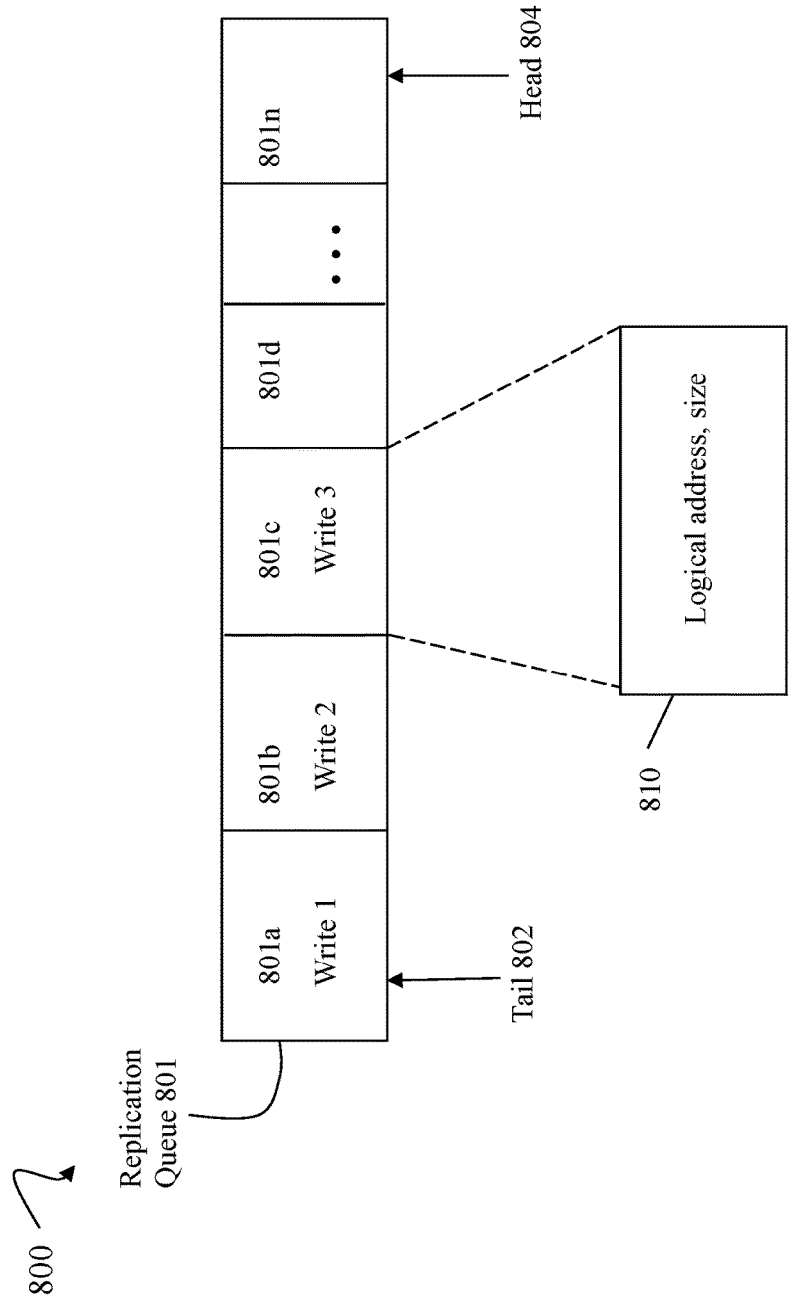
FIGS. 8, 9, 10 and 11 are examples illustrating various structures in at least one embodiment in accordance with the techniques of the present disclosure.

Referring to FIG. 8, shown is an example 800 of a replication queue 801 that can be used in at least one embodiment in accordance with the techniques of the present disclosure.

In at least one embodiment, the replication queue 801 can be implemented as a single queue including write I/Os received at the data storage system, where such write I/Os are directed to LUNs or volumes for which asynchronous replication using the techniques of the present disclosure has been enabled and is being performed. As a variation, rather than the single queue 801, a separate replication queue including write I/Os can be maintained on a per LUN or volume basis.

In the example 800, a new entry can be added to the replication queue 801 for each write I/O received at the source R1 system 2102, where the write is directed to one of the LUNs for which asynchronous replication using the techniques of the present disclosure has been enabled and is being performed. The replication queue 801 can be a FIFO (first in first out) queue with a tail pointer 802 to the oldest entry of the queue 801 and a head pointer 804 to the youngest or most recently added entry of the queue 801. In the example 800, new entries can be added to the head 804 of the queue 801 as new writes to LUNs configured for asynchronous remote replication are received by the source R1 system 2102. As records are removed from the tail 802 of the replication queue 801, for example, as recorded write data of such entries at the tail 802 are replicated from the source R1 system 2102 to the remote destination R2 system 2104, such entries can be removed from the tail 802 of the replication queue 801 and reused.

In at least one embodiment, each entry of the replication queue 801 corresponding to a received write of a LUN configured for asynchronous remote replication can identify the logical address of the write and the size of the write data. Thus the logical address can denote the target logical address where write data is written. The size can denote the amount of the write data written by the write operation. Any suitable size or storage unit can be utilized and recorded in entries of the replication queue 801 for received write I/Os directed to LUNs configured for asynchronous remote replication. The element 810 illustrates the foregoing logical address and size that can be included in the entry 801c of the replication queue 801. More generally, each entry 801a-n of the replication queue 801 corresponding to a received write I/O received at the source R1 system 2102 can include the information as illustrated in more detail by the element 810.

In at least one embodiment having a single replication queue 801 including writes directed to all LUNs configured for asynchronous replication on the source R1 system, the logical address of entry 810 for each such recorded write in the queue 801 can denote both the LUN and the LBA or offset on the LUN. In at least one embodiment, the received write corresponding to the entry 801c can identify the target logical address using a LUN and LBA recorded as the logical address of 810. Additionally, the received write corresponding to the entry 801c can identify the size of the write data payload, where the size can be recorded as the size of 810.

In at least one embodiment, both the source R1 system 2102 and the remote destination R2 system 2104 can be log based systems which generally record received write I/Os in a transaction log and process such write I/Os of the transaction log as described above, for example, in connection with FIGS. 3-6. Thus for each write I/O recorded in the replication queue 801 a corresponding entry can also be recorded in the transaction log of the source system 2102, and the write data for each such write I/O can be stored in cache of the source R1 system 2102.

In at least one embodiment, the replication queue 801 can be stored in volatile memory of the source R1 system 2102.

In at least one embodiment, writes received at the source R1 system which are directed to LUNs configured for asynchronous remote replication can have a corresponding entry to the replication queue 801 in ingest or received time order with the oldest unreplicated write operation/write data being stored at the tail 804 of the replication queue 801, and where the most recently received unreplicated write operation/write data can be stored at the head 804 of the replication queue 801. In this manner, the logical ordering in which writes appear in the queue 801 from the tail 802 to the head 804 can denote the increasing time order in which the writes are received by the source R1 system. Additionally, the foregoing order from tail 802 to head 804 denotes a FIFO queue order in which the writes can be replicated from the source R1 system 2102 to the remote R2 destination system. In at least one embodiment, the foregoing FIFO order from tail 802 to head 804 denotes a stream of records including writes directed to R1 LUNs, such as R1 2124 of the source R1 system 2102, where the logical FIFO ordering of such writes can be applied to the remote counterpart R2 LUNs, such as R2 2126 of the remote destination R2 system 2104.

In at least one embodiment, the RRF or replication service 2102a of the source R1 system 2102 can be configured to perform asynchronous remote replication for one or more LUNs, such as the source LUN denoted as R1 2124. In at least one embodiment, the RRF can issue a command to create a snapshot of the R1 LUN 2124 where the snapshot is a replication related snapshot. Th RRF can issue such a command or request to create a snapshot at predetermined time intervals, for example, such as based on the RPO of a defined replication schedule. In accordance with the techniques of the present disclosure, an actual snapshot may not be created on the source R1 system 2102 in connection with the request to create a replication related snapshot. In such an embodiment, the RRF can utilize its same interface and issue the create snapshot command as it would in connection with an existing snap diff technique. However, in accordance with the techniques of the present disclosure for such requests for a replication related snapshot, the replication related snapshot may not be actually created. In accordance with the techniques of the present disclosure, responsive to the RRF issuing a request to create a replication related snapshot for the source LUN, R1 2124 configured to asynchronous remote replication, a barrier or checkpoint command record can be added to the replication queue 801. Additionally, a barrier or checkpoint command record can also be added to the transaction log. In such an embodiment, the requests for the replication related snapshots can include inserting related barrier or checkpoint command records in the replication queue 801 and transaction log as discussed below. However in at least one embodiment, for the replication related snapshots, processing on the source system 2102 can omit creating snapshot structures, and the like. The barrier or checkpoint records or commands can be inserted into structures discussed in more detail below, such as, for example, the replication queue, transaction log, and replication log, to allow the remote R2 system 2104 to construct snapshots corresponding to the received stream including replicated writes between successive barrier or checkpoint records. Generally, writes between two successive checkpoint records can be included in the same snapshot. In this manner, the remote R2 system 2104 can use the received stream of replicated writes and checkpoint records to construct one or more snapshots which are write consistent across multiple LUNs. In at least one embodiment, the source R1 system 2102 can provide the stream including writes and checkpoint records to the destination R2 system 2104 without having the R1 system 2102 actually build or construct the snapshots and without having the R1 system 2102 perform the snap diff technique for the purpose of asynchronous replication.

Figure 9:
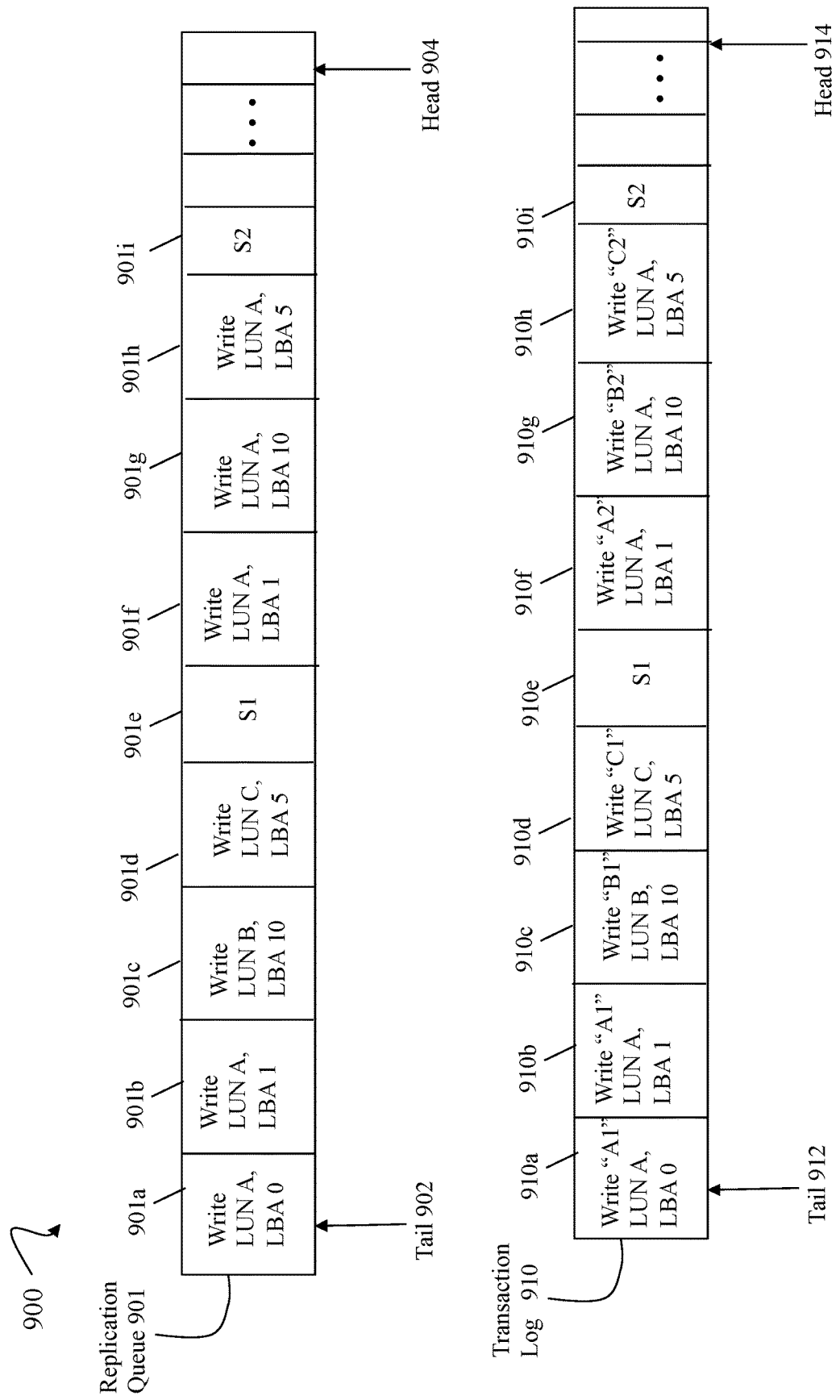

Referring to FIG. 9, shown is an example 900 illustrating a replication queue 901 and a transaction log 910 in at least one embodiment in accordance with the techniques of the present disclosure. The structures 901 and 910 can be maintained and included on the source R1 system 2102.

In the example 900, assume that the source R1 system 2102 includes 3 R1 source LUNs A, B and C configured for asynchronous remote replication, respectively, to R2 counterpart LUNs A', B', and C' of the remote destination R2 system 2104. Also assume in this example that the LUNs A, B and C are in a configured CG, CG1, on the system 2102, and the LUNs A', B' and C' are included in a configured CG, CG1', on the system 2104.

In the example 900, the replication queue 901 can denote a sequence or stream of records recorded for received writes directed to LUNs A-C on the source R1 system 2102 and also for 2 snapshot creation requests for replication related snapshots. Generally, a record of the replication queue 901 and transaction log 910 recorded for a replication related snapshot can be denoted as Sn. The record 901e denotes a first request by the RRF to create a replication related snapshot, and the record 901i denotes a second request by the RRF to create a replication related snapshot. The records 901a-d and 901f-h denote records of writes directed to LUNs A-C. The records S1 901e and S2 901i denote checkpoint or barrier records in the replication queue 901.

The recorded writes 901f, 901g and 901h between S1 901e and S2 901i can be applied as a single group to the LUNs A-C to maintain write consistency across the CG1 on the R1 source system 2102 and also applied as a single group to the LUNs A', B' and C' to maintain write consistency across the CG1' on the R2 system 2104.

The records 901f-h between the two checkpoint records or commands 901e and 901i represent 3 write operations which the R2 system 2014 can include in a first snapshot S1. The records 910f-h between the two checkpoint records or commands 910e and 910i represent the same 3 write operations (as the entries 901f-h) which the R2 system 2204 can include in the first snapshot S1. Any subsequently recorded writes following the replication queue entry 901i and following the transaction log entry 910i can be included in another second snapshot S2.

In the example 900, the transaction log 910 can correspond to the log as generally described, for example in connection with FIGS. 3-6. In the example 900, the transaction log 910 can denote a sequence or stream of records recorded for received writes directed to LUNs A-C on the source R1 system 2102 and also for 2 snapshot creation requests for replication related snapshots. The record 910e is similar to 901e and denotes the first request by the RRF to create a replication related snapshot. The record 910i is similar to the record 901i and denotes the second request by the RRF to create a replication related snapshot. The records 910a-d and 910f-g correspond, respectively, to the recorded writes of the records 901a-d and 901f-h of the replication queue 901 of writes directed to LUNs A-C. The records S1 910e and S2 910i denote checkpoint or barrier records in the transaction log 910. The recorded writes 910f-h between S1 910e and S2 910i can be applied as a single group to the LUNs A-C to maintain write consistency across the CG1 on the R1 source system 2102 and also applied as a single group to the LUNs A', B' and C' to maintain write consistency across the CG1' on the R2 system 2104.

The RRF can process and replicate write data and checkpoint or barriers associated with entries of the replication queue 901 in order from tail 902 to head 904. In the example 900, the RRF can process and replicate entries of the replication queue 901 in the following sequential consecutive order of entries 901a-901i. This is discussed in more detail below.

In at least one embodiment, replication configuration information can be maintained on a per object or per LUN basis for each LUN A, B and C of the source R1 system 2102 indicating whether each such LUN is configured for replication, and in connection with the techniques of the present disclosure, configured to asynchronous remote replication.

In at least one embodiment, writes of the transaction log 910 can be flushed or destaged to the BE PDs as discussed above, for example, in connection with FIGS. 3-6 with additional processing discussed below. When flushing a particular entry of the transaction log 910 has completed storing the write data on the BE PDs and updated the associated mapping information, additional processing can be performed in at least one embodiment in accordance with the techniques of the present disclosure. Assume, for example, that flushing or destaging has been completed for the transaction log entry 910a and also for the transaction entry 910b that writes the write data "A1" to the target logical address LUN A, LBA 1. Assume for illustration purposes that the replication queue entry 901a corresponding to the transaction log entry 910a has been replicated but that the replication queue entry 901b has not yet been replicated. Assume further that processing is also performed to now reclaim or remove the transaction log entry 910b. In at least one embodiment, prior to removing or reclaiming the transaction log entry 910b, the additional processing can be performed. The additional processing can include determining whether the target logical address of the entry 910b identifies a LUN that is tagged as configured for asynchronous remote replication. If so, the additional processing can further determine whether the flushed transaction log entry's associated write operation and write data "A1" stored at the target logical address LUN A, LBA1 has already been replicated. The additional processing can make such a determination in any suitable manner. For example, in at least one embodiment, the additional processing can further include checking the replication queue 901 to identify any entries of the replication queue 901 a) which have not yet been replicated from the source R1 system to the remote destination R2 system, and b) which represent the write I/O directed to the same target logical address as the flushed transaction log entry 910b. For such entries of the replication queue 901 meeting the foregoing conditions a) and b) (e.g., both condition a and condition b evaluate to true), the additional processing can further include creating corresponding entries in a replication log illustrated in more detail in connection with FIG. 10.

Consistent with other discussion herein, the replication log can include entries for write operations and associated write data, where the write data for such write operations has not yet been replicated from the source R1 system to the destination R2 system, and where records of the transaction log corresponding to such write operations have been flushed or destaged such that the associated write data has been written to the BE PDs. In this case, the write data for such write operations may not be guaranteed to be stored in the cache. As noted above, write data for a write operation having an associated entry in the transaction log 910 can be guaranteed to remain in the R1 system cache so long as the associated transaction log entry has not been flushed from the transaction log 910. If the write data of the flushed associated entry of the transaction log has not yet been replicated to the R2 system 2104, the write data may not be in the cache when the RRF needs the write data for replicating to the R2 system 2104. As a result, the RRF can experience a cache miss when attempting to obtain the write data for replication from the cache. In accordance with the techniques of the present disclosure, responsive to such a cache miss with respect to write data to be replicated, the replication log can be used to directly read the write data needed for replication by the RRF from the BE PDs rather than, for example, using the mapping information.

To further illustrate with reference to FIG. 9, assume that the transaction log entries 910a and 910b have been flushed. In at least one embodiment, the additional processing performed in connection with the transaction log entry 910b can include determining whether the target logical address of the entry 910b identifies a LUN that is tagged as configured for asynchronous remote replication. In this case, the entry 910b identifies the LUN A which is marked or tagged as configured for asynchronous remote replication. In this instance, the additional processing of the entry 910b can further include checking the replication queue 901 to identify entries of the replication queue 901 a) which have not yet been replicated from the source R1 system to the remote destination R2 system, and b) which represent write I/Os directed to the same target logical address, LUN A LBA1 as the transaction log entry 910b. In this example, assume that only the record 901a of the replication queue 901 has been replicated from the R1 system 2102 to the R2 system 2104 and assume that the transaction log entries 910a-b have been flushed from the log so that the write data or content "A1" stored at the target logical address LUN A, LBA1 has been written to a storage location at "Address 1" on the BE PDs.

In this case, the replication queue 901 can be traversed to identify entries 901b and 901f both having a target logical address matching the target logical address LUN A, LBA1 of the flushed transaction log entry 910b. In connection with the additional processing for the flushed transaction log entry 910b in at least one embodiment, a corresponding entry can be made in the replication log for the replication queue entry 901b but not the replication queue entry 901f since the entry 901f corresponds to a different write I/O operation than the transaction log entry 910b. The additional processing can determine, for example, that the replication queue entry 901b of occurs prior to the checkpoint S1 901e similar to the transaction log entry 910b which also occurs prior to the checkpoint S1 910e. Thus, the transaction log entry 910b can be determined to represent the same write I/O operation as the replication log entry 901b for which an entry can be added to the replication log. Processing can determine that the replication queue entry 901f is after the checkpoint S1 901e and therefore is determined not to correspond to the write I/O of the transaction log entry 910b. More generally, an embodiment can use any suitable technique to determine a corresponding replication queue entry for a particular transaction log entry, where both the replication queue entry and the transaction log entry can represent the same recorded write I/O operation.

In at least one embodiment, each record of the transaction log 910 can be assigned a unique LSN (logical sequence number). The LSN assigned to each record can denote a next LSN in a sequence of LSN values. In at least one embodiment, an LSN counter can be an integer counter or index that is incremented, such as by 1, each time a new write or other operation is logged in a next record of the transaction log. The value of the LSN counter can always increases and can denote an absolute location or record number in the transaction log file. When logging an operation in a record of the transaction log, the current value of the LSN counter can be assigned to the record. Subsequently the LSN counter is incremented.

Thus, each record of the transaction log can be assigned a different LSN and can be assigned the current value of the LSN counter. The LSN may be used to denote a sequential time ordering and position of the records in the transaction log. Thus each record and logged write of the transaction log can have a unique LSN where the logged writes are applied in a write consistent order based on the increasing LSNs associated with the log records. For example, to maintain write order consistency of data, logged writes are logically applied in a sequential order based on the increasing LSNs where the log record with LSN=N is applied prior to the record with LSN=N+1. Any optimization performed, such as to flush selected transaction log records in parallel, must maintain the same data consistency and resulting data as if the log records had been flushed and destaged in sequential order based on increasing LSNs of the transaction log records. Consistent with other discussion herein, when flushing the transaction log in at least one embodiment, storage of the flushed records can be reclaimed or freed by moving the tail pointer to the flushed record with the highest LSN of all flushed records. In at least one embodiment, a first entry of the replication queue 901 corresponding to a second entry of the transaction log where both the first and second entries are records describing the same write operation can have matching associated LSNs or another matching identifier.

Figure 10:
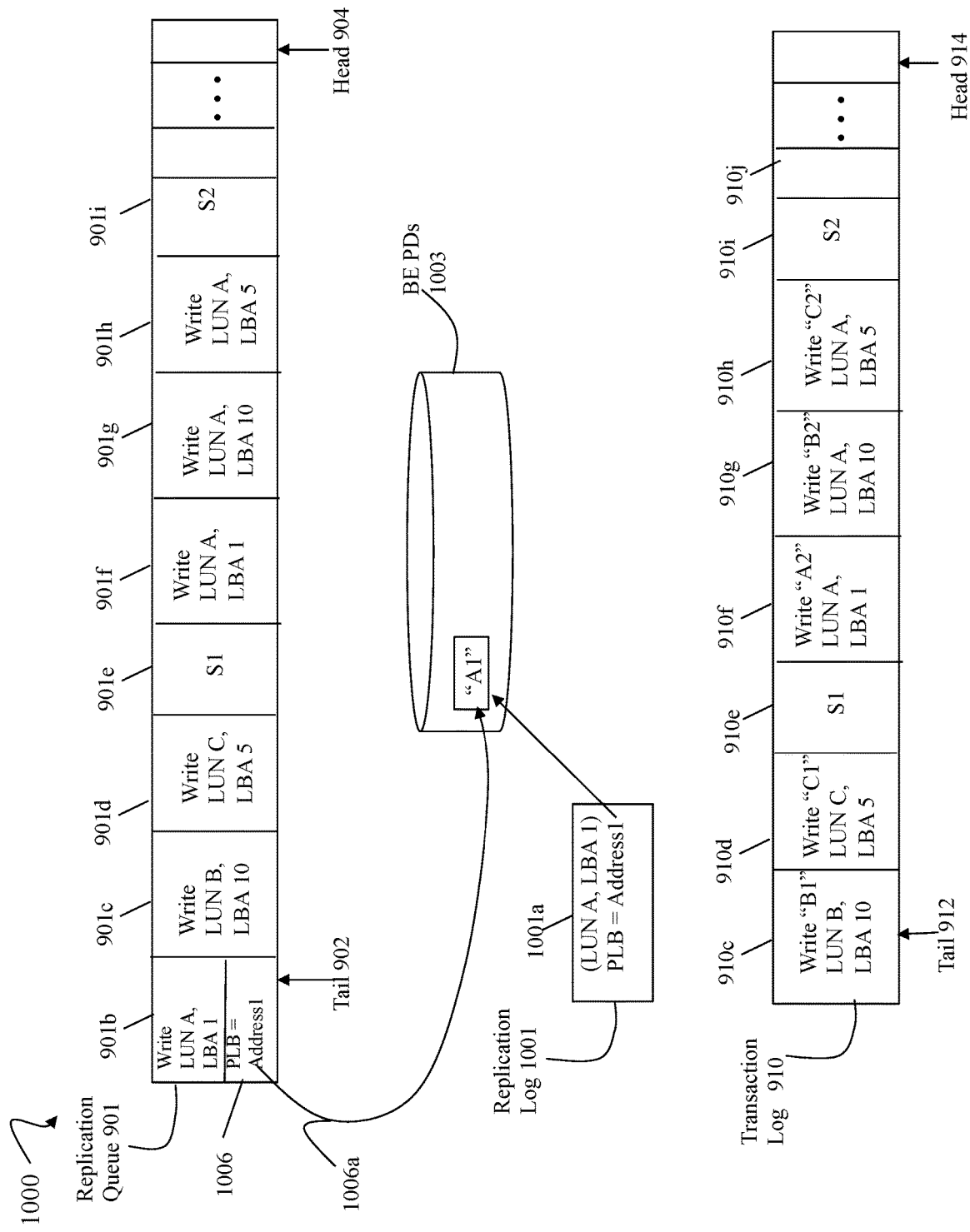

Referring to FIG. 10, shown is an example 1000 illustrating the structures from FIG. 9 along with the BE PDs 1003 after the transaction log entry 910b has been flushed. In the example 1000 as noted above, entries of the replication queue 901 prior to but not including the entry 901b have been replicated from the R1 system 2102 to the R2 system 2104.

The transaction log 901 of the example 1000 has been updated with respect to FIG. 9 to denote that the transaction log entries 910a-b have been flushed and reclaimed. Additionally, shown in FIG. 10 is the replication log 1001 including the entry 1001a. The replication log entry 1001a is added to the replication log 1001 in response to the additional processing described above for the flushed transaction log entry 910b which corresponds to a flushed write operation that writes to the content "A" to the target logical address LUNA, LBA1. In this case, the additional processing determines that the write data written by the write operation record in the flushed transaction log entry 910*b* has not yet been flushed. In particular in at least one embodiment, the additional processing can determine that the flushed transaction log entry 910*b* writes to the target logical address LUNA, LBA1 having a matching or corresponding replication queue entry 901*b* that has not yet been replicated. Accordingly, the replication log entry 1001*a* is created which includes a logical address-physical storage location pair for the target logical address LUN A, LBA 1 having the content "A1" stored at the physical storage block, location or address "Address1". The notation "PLB=Address1" of the entry 1001*a* can denote the physical storage location or address of the content "A1" on the BE PDs 1003, where the content "A1" is stored at the target logical address LUN A, LBA 1. More generally, the additional processing creates an entry in the replication log 1001 for a flushed transaction log entry of a write operation that writes content or data to a target logical address and where the write operation and write data of the flushed transaction log entry have not yet been replicated. The created replication log entry for a flushed but not yet replicated write operation/write data can include the target logical address of the write operation and can include the associated physical storage location or PLB of the content or write data stored at the target logical address by the write operation.

In at least one embodiment, in addition to creating the replication log entry 1001*a* for the flushed transaction log entry 910*b* whose write data is flushed to the BE PDs but not yet replicated, the additional processing can also include adding a reference pointer to, or address of the write data in the associated entry 901*b* of the replication queue 901. For example, the PLB=Address1 (1006) denoting the physical storage location or address of the write data stored at the target logical address LUN A, LBA1 can also optionally be added to the replication queue entry 901*b*. As illustrated, the portion 1006 of the replication queue entry 901*b* is "Address1" which is the physical location or PLB of the content "A1". The arrow 1006*a* denotes that the PLB=Address1 (1006) points to or references the physical location of the content "A1" stored at the target logical address LUN A, LBA1. Thus generally, storing the physical storage location or address, Address 1, as denoted by the element 1006 in the replication queue entry 901*b* can be optional since the physical location or address of the write data "A1" of the logical address LUN A, LBA1 is persistently stored as part of the replication log entry 1001*a*.

In at least one embodiment, the replication log 1001 and the transaction log 910 can both be persistently stored on non-volatile storage. In such an embodiment, the replication queue 901 can be stored on volatile storage.

Continuing with the above example of FIG. 10, assume that flushing continues to flush or destage transaction log entries 910*c-d* Additional processing can determine that the transaction log entry 910*c* records a write directed to LUN B which is configured for asynchronous remote replication. Additional processing for the flushed transaction log entry 910*c* can also determine that the write data written by the transaction log entry 910*c* has been flushed but not yet replicated since the replication queue 901 includes the corresponding replication queue entry 901*c*. In this case with reference to FIG. 11, the entry 1102*a* can be added to the replication log 1001 for the flushed but not yet replicated write operation and write data of the flushed transaction record 910*c*. Additional processing can determine that the transaction log entry 910*d* records a write directed to LUN C which is configured for asynchronous remote replication. Additional processing for the flushed transaction log entry 910*d* can also determine that the write data written by the transaction log entry 910*d* has been flushed but not yet replicated since the replication queue 901 includes the corresponding replication queue entry 901*d*. In this case with reference to FIG. 11, the entry 1104*a* can be added to the replication log 1001 for the flushed but not yet replicated write operation and write data of the flushed transaction record 910*d*.

Flushing of the transaction log 1001 can continue with the entry 910*e* for the checkpoint record or command S1. Before reclaiming the entry 910*e*, additional processing can determine that the entry 910*e* denotes a checkpoint record which has not yet been replicated since the S1 checkpoint of the replication queue entry 901*e* corresponds to the S1 checkpoint of the transaction log entry 910*e*. In this case with reference to FIG. 11, the entry 1106*a* is added to the replication log 1001 for the not replicated transaction record 910*e*.

Flushing of the transaction log 1001 can continue with the entries 910*f, g* and *h*. Additional processing can determine that the transaction log entry 910*f* records a write directed to LUN A which is configured for asynchronous remote replication. Additional processing for the flushed transaction log entries 910*f-h* can determine that the write data written by the transaction log entries 910*f-h* have been flushed but not yet replicated since the replication queue 901 includes the corresponding replication queue entries 901*f-h*. In this case with reference to FIG. 11, the entries 1108*a*, 1110*a* and 1112*a* can be added to the replication log 1001 for the flushed but not yet replicated write operation and write data, respectively, of the flushed transaction records 910*f-h*.

Flushing of the transaction log 1001 can continue with the entry 910*i* for the checkpoint record or command S2. Before reclaiming the entry 910*i*, additional processing can determine that the entry 910*i* denotes a checkpoint record which has not yet been replicated since the S2 checkpoint of the replication queue entry 901*i* corresponds to the S2 checkpoint of the transaction log entry 910*i*. In this case with reference to FIG. 11, the entry 1114*a* is added to the replication log 1001 for the not replicated transaction record 910*i* for checkpoint S2.

Figure 11:
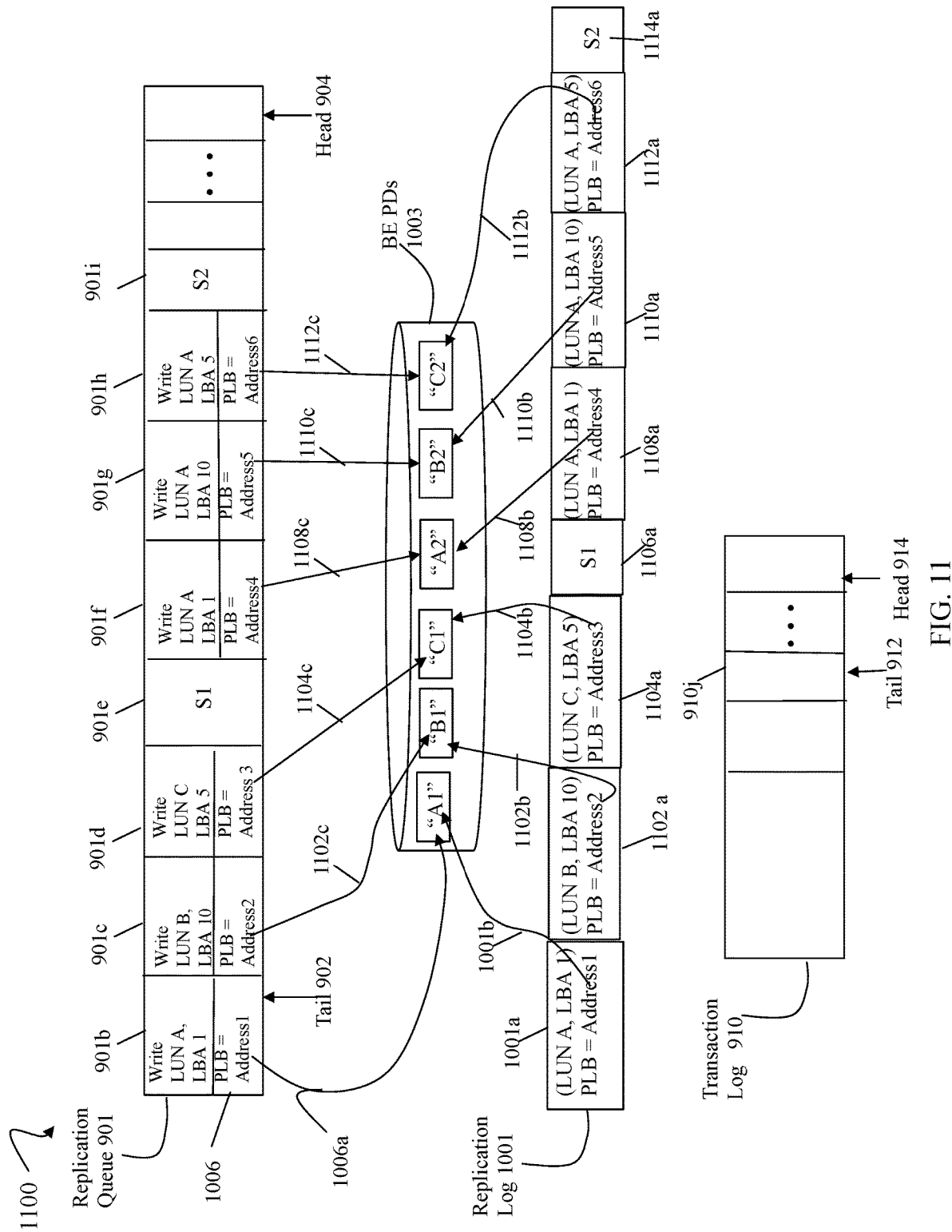

Referring to FIG. 11, shown is an example 1100 showing the state of the structures 901, 910, 1001 and the BE PDs after transaction log records up to but not including 910*j* have been flushed and processed in accordance with the techniques of the present disclosure.

It should be noted that in at least one implementation not in accordance with the techniques of the present disclosure, the source system 2102 may have created a snapshot for each of the one or more LUNs written to by a write recorded in the transaction log 1001 between the two checkpoint successive checkpoint records S1 910*e* and S2 910*i*. In the example of FIG. 10, such a system not in accordance with the techniques herein would have, for example, created various metadata structures for the snapshot of LUN A and included the writes of transaction records 910*f-h* in the snapshot of LUN A. In a similar manner, if other writes to other LUNs were also recorded in transaction log records between the checkpoint records 910*e* and 910*i*, snapshots would have been created for each such other LUN in a similar manner. In contrast, rather than actually create the snapshot for LUN A in an embodiment in accordance with the techniques of the present disclosure, processing in accordance with the present techniques can include creating corresponding replication log records 901*e-i*, respectively, for such transaction log records 910*e-i*. Such records or entries in the replication log and transaction log can denote snapshot semantics without the source R1 system having to actually instantiate or create snapshots.

In the example 1100, the replication queue entry 901c can include the physical location or address (PLB) of Address2 that points (1102c) to the storage location of the contents "B1" stored at LUN B, LBA 10. The replication queue entry 901d can include the physical location or address (PLB) of Address3 that points (1104c) to the storage location of the contents "C1" stored at LUN C, LBA 5. The replication queue entry 901f can include the physical location or address (PLB) of Address4 that points (1108c) to the storage location of the contents "A2" stored at LUN A, LBA 1. The replication queue entry 901g can include the physical location or address (PLB) of Address5 that points (1110c) to the storage location of the contents "B2" stored at LUN A, LBA 10. The replication queue entry 901h can include the physical location or address (PLB) of Address6 that points (1112c) to the storage location of the contents "C2" stored at LUN A, LBA 5.

In the example 1100, the replication log entry 1102a can include the Address2 which points (1102b) to the physical storage location or PLB including the content "B1" stored at the logical address LUN B, LBA 10. The replication log entry 1104a can include the Address3 which points (1104b) to the physical storage location or PLB including the content "C1" stored at the logical address LUN C, LBA 5. The replication log entry 1108a can include the Address4 which points (1108b) to the physical storage location or PLB including the content "A2" stored at the logical address LUN A, LBA 1. The replication log entry 1110a can include the Address5 which points (1110b) to the physical storage location or PLB including the content "B2" stored at the logical address LUN A, LBA 10. The replication log entry 1112a can include the Address6 which points (1112b) to the physical storage location or PLB including the content "C2" stored at the logical address LUN A, LBA 5.

In at least one embodiment, as write data and checkpoint records of the replication queue 901 are replicated from the R1 system 2102 to the R2 system 2104, such records can be removed from the replication queue 901 and also have their corresponding records removed from the replication log 1001

In accordance with the techniques of the present disclosure, write data and checkpoints of flushed transaction records which have not yet been replicated from the source R1 system 2102 to the destination R2 system can be persisted in the replication log 1001. In at least one embodiment at any point in time, all write data and checkpoints of LUNs configured for asynchronous remote replication may have either been replicated to the destination R2 system, exist in the transaction log (e.g., in a transaction log record not yet flushed), or exist in the replication log (e.g., in a replication log record since the write data or checkpoint was included in a transaction record that has been flushed but not yet replicated to the R2 system).

With reference to the example of FIGS. 9, 10 and 11, the LUNs A, B and C can be configured for asynchronous remote replication where any writes to such LUNs or checkpoints indicating to create snapshots for any of the LUNs A, B and/or C have either been replicated to the R2 system (e.g., such as the write of the transaction log record 910a), exist persistently as an entry in the transaction log, or otherwise exist persistently as an entry in the replication log (e.g., such as the writes/write data and checkpoints of replication log entries 1001a, 1102a, 1104a, 1106a, 1108a, 1110a, 1112a and 1114a).

In at least one embodiment, the source R1 system 2102 can perform replication of the write data and checkpoint records or commands by processing replication queue 901 from tail to head, or more generally in ingest or FIFO order. Thus, using the replication queue 901 provides for copying the original or source stream, which can include write I/Os and checkpoints, to destination R2 system with some delay. In at least one embodiment, the write data to be replicated from the R1 system 2102 to the R2 system 2104 can be obtained from the cache of the R1 system in a majority of cases (e.g., assuming a high RPO and low lag). For a write operation having a replication queue entry, the replication queue entry indicates that the write data D written by the write operation to a target address T needs to replicated. For example, the entry 901b indicates that the logical address LUN A, LBA 1 has write data or content "A1" stored at the physical location or address "Address1". The RRF can first attempt to read the write data or content stored at LUN A, LBA 1 from the source R1 system's cache. If this results in a cache hit, the content "A1" can be read from corresponding cache entry and replicated from the R1 system 2102 to the R2 system 2104. If the foregoing read results in a cache miss, the RRF can alternatively use the reference or address, "Address1" of the replication log entry 901b to directly access and read the write data or content "A1". With the replication queue 901, checkpoints (i.e., barriers) are transferred or replicated from the R1 system to the R2 system in the same stream as write data/write operations. In connection with the replication, information transferred for a single replication queue entry denoting a write operation can include the write data and the logical address (e.g., R1 device) to which write data is applied on the R1 system. The R2 system can receive the write data and the logical address and can apply the write data to the corresponding remote counterpart R2 device (e.g., counterpart for the R1 device of the R1 system). In at least one embodiment where the replication queue entries, such as the entry 901b, do not include a reference, address or pointer, such as 1006, directly to the write data to be replicated, the corresponding entry of the replication log 1001 can be used to obtain the reference, address or pointer used to directly access the write data to be replicated. For example, assume that the replication queue entry 901b did not include the reference 1006. In this case, the replication log 1001 can be traversed or queried to locate the corresponding replication log entry 1001a which corresponds to the replication queue entry 901b. The replication log entry 1001a includes the reference, pointer or address="Address1" used to directly access (1001b) the content A1 stored at the logical address LUN A, LBA1.

On the destination R2 system in at least one embodiment, the replicated checkpoints of the replication queue 901 can be used to create snapshots on the R2 system and/or provide CG semantics to LUNs configured in a CG or multiple LUNs which may be modified by a transaction of writes between two successive checkpoints. Alternatively in some embodiments, checkpoints may be ignored on destination R2 system if snapshot semantics represented by the checkpoint records are not used or required by destination R2 system.

In at least one embodiment as an optimization, write data/write operations of replication queue records occurring between two checkpoints may be transferred in parallel for better link utilization. It should be noted that writes applied on the R2 system in parallel may not cross checkpoint boundaries as denoted in the replication queue's time order in order to maintain desired write consistency. In at least one embodiment, records (e.g., write data/write operations and checkpoints) of the replication queue 901 can be transferred in FIFO order or ingest order. As a variation in at least one embodiment, transferring records of the replication queue 901 can be transfers in another order that is not strictly FIFO or ingest order (e.g., from tail 902 to head 904 order) so long as the desired write consistency denoted by the checkpoints is preserved. In at least one embodiment, the source R1 system can perform write folding. Write folding can combine multiple writes or overwrites into a single write, where such multiple writes can write to the same logical address and occur between the same two successive checkpoints. Writes to the same logical address which do not occur between the same two successive checkpoints cannot be combined. In at least one embodiment, the checkpoints can be inserted into the time ordered sequence of recorded records of writes in the replication queue to preserve data ordering and write consistency based on the placement and semantics of the checkpoint records. In at least one embodiment, the occurrence of a new checkpoint can denote the boundary of writes to be included in a snapshot. For example with reference to the example 1100 of FIG. 11, the writes represented by entries 901b-d can be included in one snapshot snap1, the writes represented by the entries 901f-h can be included in another snapshot snap2, and any write represented by entries following the checkpoint record S2 901i (and prior to the occurrence of another checkpoint record in the replication queue 901) can be included in a third snapshot snap3. In this manner, the checkpoint records can be used to denote the snapshot semantics in the stream of records (including writes and checkpoints) replicated from the R1 system 2102 to the R2 system 2104 without the R1 system. For replication related snapshots used to preserve write consistency across one or more LUNs at different points in time, writes to be included in the same write transaction can be included between the two successive checkpoints in the replication log.

As noted above, the entries of the replication queue 901 also include a reference, pointer or address to the PLB or physical location on the BE PDs storing the write data. For example, the entry 901b can include the field 1006 with the reference, address or pointer (1006a) used to directly access the write data or content "A1" to be replicated. In such an embodiment, the replication log 1001 can be used solely for restoring the volatile replication queue 901, for example, in the event of a source R1 system crash, reboot, failure or other event causing the R1 system 2102 to go offline and then subsequently return to an online status such as through reboot. Alternatively, if the entries of the replication queue 901 do not include a reference, pointer or address to the PLB or physical location on the BE PDs storing the write data, then corresponding entries in the replication log including the reference, pointer or address to the PLB or physical location of the write data can be used to read the write data from the BE PDs in the case where such write data is not already stored in the R1 system cache. For example, if the replication queue entry 901b does not include the field 1006 and the write data stored at LUN A, LBA1 is not in the R1 system cache, the write data stored at LUN A, LBA 1 can be retrieved by locating the corresponding replication log entry 1001a and using the reference, pointer or address of "Address1" to access (1001b) the write data "A1" to be replicated.

The replication log can be stored on non-volatile storage as noted above such as, for example non-volatile RAM. In R1 systems having multiple tiers of non-volatile storage, the replication log can be demoted from a first high tier of non-volatile storage, such as non-volatile RAM, to a lower ranked and lower performance non-volatile storage tier, such as a non-volatile SSD tier. The replication queue can be maintained in volatile memory and can include the logical addresses of write data, or more generally modified content. to be replicated. Optionally, the replication queue entries can include the same references, addresses, or pointers to the PLBs or physical storage locations on the BE PDs which contain the write data.

In at least one embodiment, the replication queue can be demoted from volatile memory to a lower performance storage tier of non-volatile SSDs. The foregoing can be done, for example, to provide sustainability in the case of long replication link failures. In this case, portions of the replication queue corresponding to portions of the replication log may be persisted twice. In some embodiments in this case, the portions of the replication which are persisted by the replication queue can be reclaimed.

In the case of a source R1 system event such as a crash, failure or other event causing the R1 system 2102 to go offline and then subsequently return to an online status such as through reboot, the replication queue stored in volatile memory can be restored using the persistently stored transaction log and the persistently stored replication log.

Figure 12A:
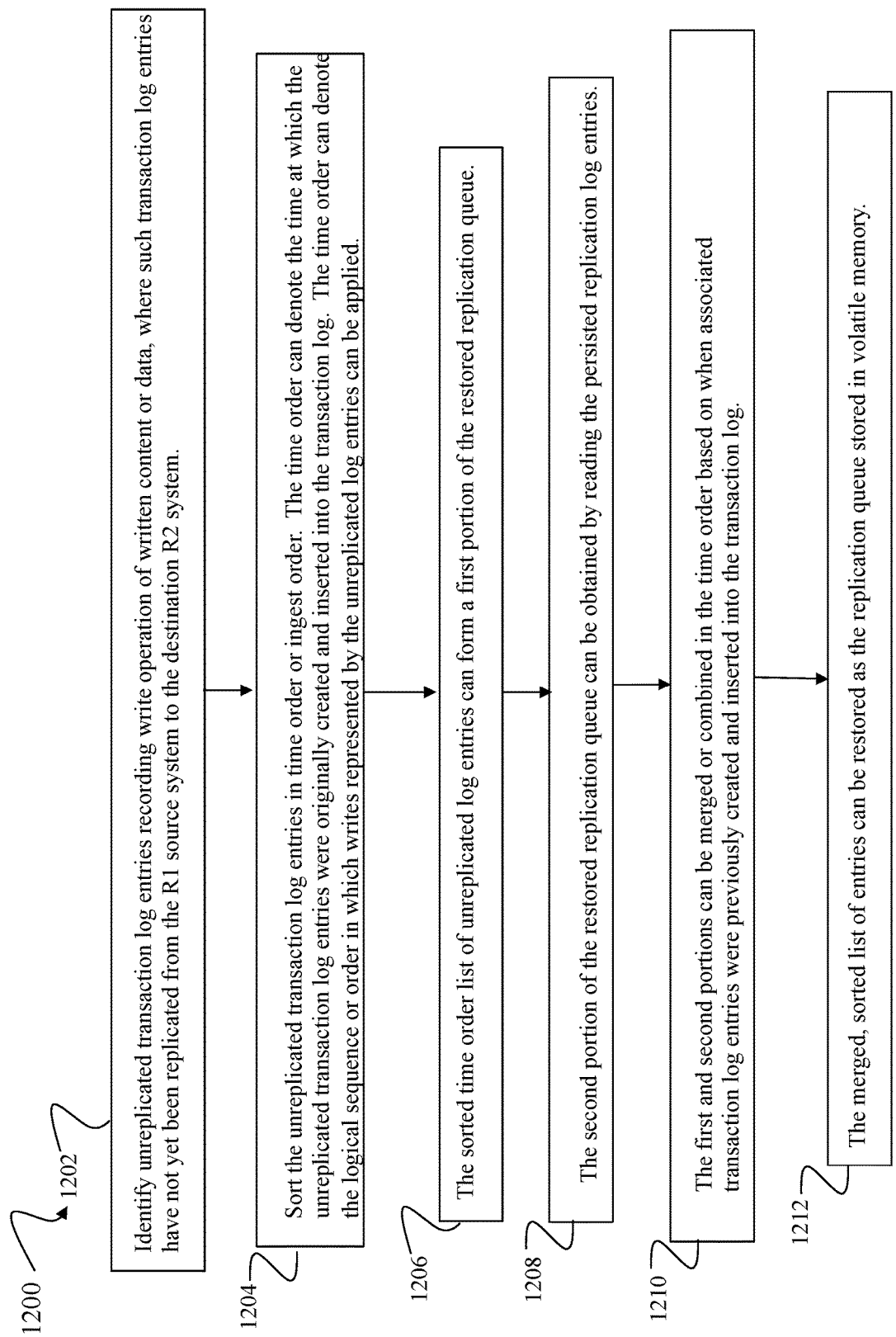
FIGS. 12A, 12B, 13, 14A, 14B, 15A and 15B are flowcharts of processing steps that can be performed in at least one embodiment in accordance with the techniques of the present disclosure.

In at least one embodiment, after failure or other event causing the R2 system to go offline and then subsequently reboot and return online, replication queue 901 can be restored as described in the following paragraphs with reference to the flowchart 1200 of FIG. 12A.

As a first step 1202, processing can be performed to identify the persistently stored unreplicated transaction log entries recording write operation of written content or data, where such transaction log entries have not yet been replicated from the R1 source system to the destination R2 system. In at least one embodiment, information can be tracked for each transaction log entry as to whether the content or write data written by the recorded write operation of the transaction log entry has been replicated or not. For example, a flag or indicator can be maintained for each transaction log entry denoting the foregoing current state of each transaction log entry. From the step 1202, control proceeds to the step 1204.

At the step 1204, processing can be performed to sort the unreplicated transaction log entries (as identified in the step 1202) in time order or ingest order. The time order can denote the relative time order at which the write operations recorded in the unreplicated transaction log entries were received by the R1 source system for processing. The time order can denote the time at which the unreplicated write transaction log entries were originally created or inserted into the transaction log. The time order can denote the logical sequence or order in which writes represented by the unreplicated log entries can be applied to maintain write consistency. In at least one embodiment, the step 1204 can perform the time order sorting based on a unique sequence identifier associated with each of the write operations recorded in the unreplicated transaction log entries. For example, LSNs are discussed above where a unique LSN can be assigned to each transaction log entry and thus each write I/O represented by the transaction log entry. From the step 1204, control proceeds to the step 1206.

At the step 1206, where the sorted time order list of unreplicated log entries from the step 1204 can be form a first portion of the restored replication queue. From the step 1206, control proceeds to the step 1208.

At the step 1208, processing can be performed to form a second portion of the restored replication queue by reading the persisted replication log entries. The step 1208 can include using all entries of the persisted replication log as the second portion of the restored replication queue. From the step 1208, control proceeds to the step 1210.

At the step 1210, processing can be performed to combine or merge and sort, in time order, the first and second portions constructed, respectively, in the steps 1206 and 1208. The combining or merging of the step 1210 can including sorting the first and second portions of entries based on the time of when the corresponding write operations represented by such entries of the first and second portions are received by the R1 system for processing. In at least one embodiment, a time stamp, unique sequence identifier such as the LSNs discussed elsewhere herein, and the like, can be used to denote the particular time and relative time order of write operations represented by the entries of the first and second portions. Generally, an embodiment can utilize any suitable technique to denote the particular time and relative time order of write operations represented by the entries of the first and second portions for combining or merging and also sorting the first or second portions in time order based on the time when the corresponding write operations represented by such entries of the first and second portions are received by the R1 system for processing. From the step 1210, control proceeds to the step 1212.

At the step 1212, processing can be performed to restore the merged, sorted list of entries (as generated or determined as a result of the step 1210 processing) as the replication queue. The step 1212 can include storing the merged, sorted list from the step 1210 in the volatile memory of the R1 system.

Subsequent to the step 1212, the R1 system can use the restored replication queue to resume performing processing in accordance with the techniques of the present disclosure.

Figure 12B:
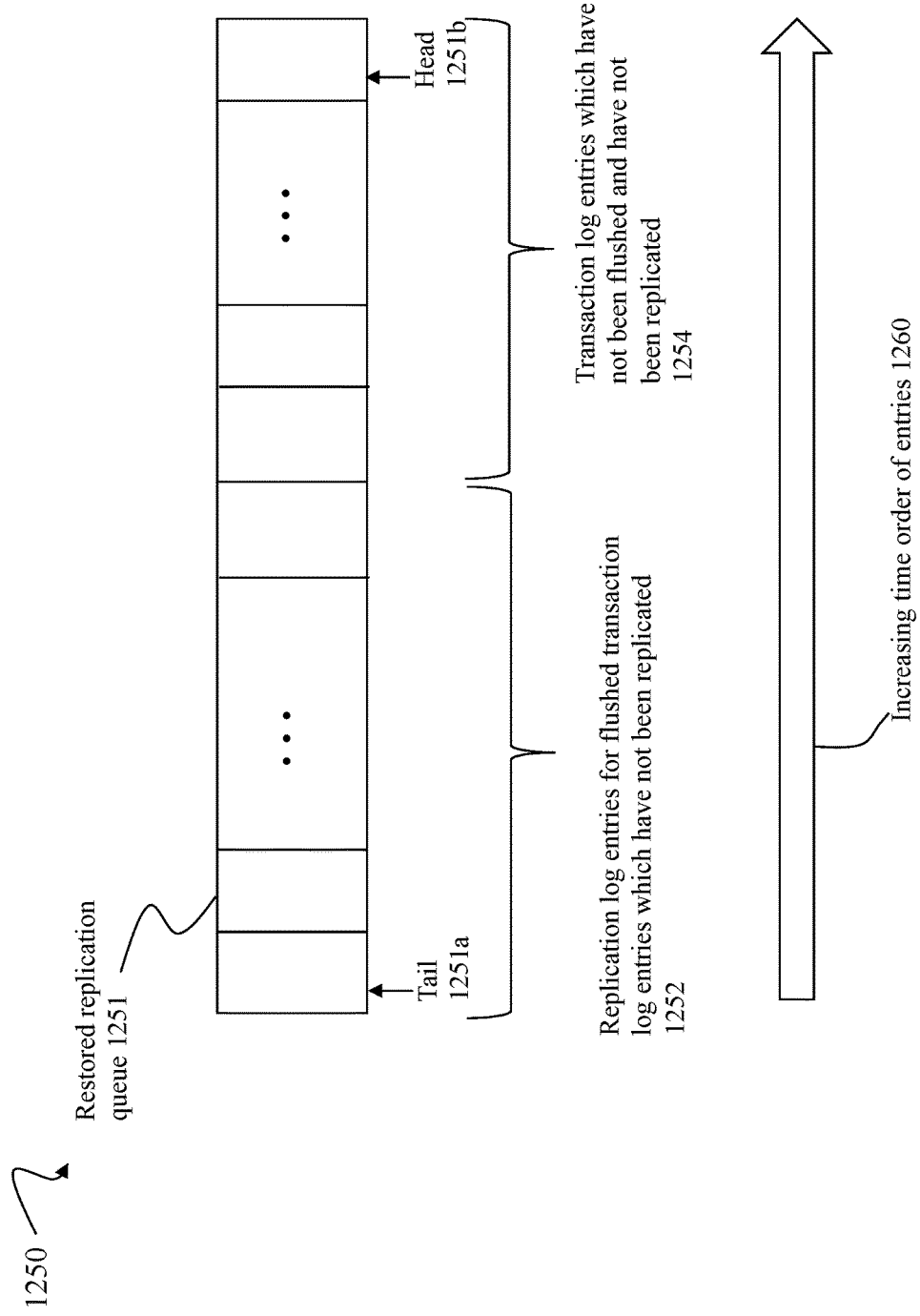

Referring to FIG. 12B, shown is an example 1250 representing the restored replication queue 1251 in at least one embodiment in accordance with the techniques of the present disclosure The restored replication queue 1251 (e.g., representing unreplicated write data or modified content written by write operations each having a corresponding entry on the restored replication queue) is illustrated as including the replication log entries (1252) for flushed transaction log entries which have not been replicated, and including the transaction log entries (1254) which have not been flushed and have also not been replicated. The example 1250 illustrates a simplistic illustration and representation of the restored replication queue 1251 where there is no time order overlap between the replication log entries 1252 and the transaction log entries 1254 which have been aggregated in time order as discussed above. More generally, however, there may be time overlap between entries of the 1252 and 1254. However in at least one embodiment, it may be that a large portion or majority of the transaction log entries 1252 are the most recent of all entries of the restored replication queue 1251, and it may be that a large portion or majority of the replication log entries are the oldest of all entries of the restored replication queue 1251. In at least one embodiment, the restored replication queue 1251 can be implemented as a FIFO queue where entries of the queue 1251 appear in an increasing time order from the tail 1251a (denoting the oldest entry in the queue 1251) to the head 1251b (denoting the youngest or most recent entry in the queue 1251). The arrow 1260 illustrates the increased time order of entries of the restored replication queue 1251 where entries of the queue 1251 can be processed in a FIFO order as described above, for example, in connection with processing of entries of the replication queue 801, 901 in connection with the FIGS. 8, 9, 10, 11 and 12. Consistent with discussion above in at least one embodiment, entries can be removed and reclaimed from the tail 1251a of the queue 1251 and new entries can be added to the head 1251b of the queue 1251 for processing in accordance with the techniques of the present disclosure.

What will now be described in connection with FIGS. 13, 14A, 14B, 15A, and 15B are flowcharts of processing steps that can be performed in at least one embodiment in accordance with the techniques of the present disclosure. The flowcharts summarize processing described above.

Figure 13:
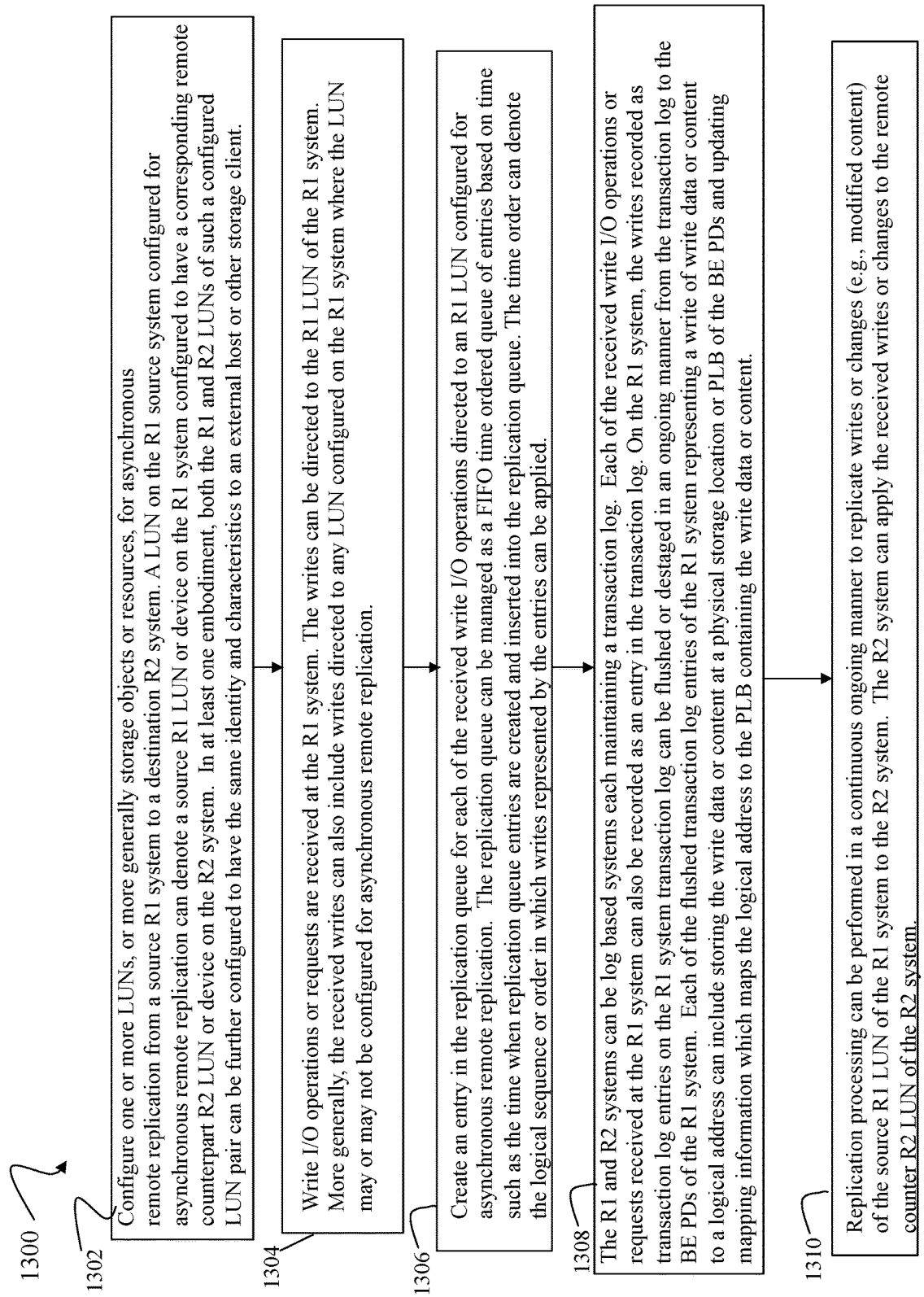

Referring to FIG. 13, shown is a flowchart 1300 of processing that can be performed in at least one embodiment in accordance with the techniques of the present disclosure.

At a step 1302, processing can be performed to configure one or more LUNs, or more generally storage objects or resources, for asynchronous remote replication from a source R1 system to a destination R2 system. A LUN on the R1 source system configured for asynchronous remote replication can denote a source R1 LUN or device on the R1 system configured to have a corresponding remote counterpart R2 LUN or device on the R2 system. In at least one embodiment, both the R1 and R2 LUNs of such a configured LUN pair can be further configured to have the same identity and characteristics to an external host or other storage client. From the step 1302, control proceeds to the step 1304.

At the step 1304, write I/O operations or requests are received at the R1 system. The writes can be directed to the R1 LUN of the R1 system. More generally, the received writes can also include writes directed to any LUN configured on the R1 system where the LUN may or may not be configured for asynchronous remote replication. From the step 1304, control proceeds to the step 1306.

At the step 1306, processing can be performed to create an entry in the replication queue for each of the received write I/O operations directed to an R1 LUN configured for asynchronous remote replication. The replication queue can be managed as a FIFO time ordered queue of entries based on time such as the time when replication queue entries are created and inserted into the replication queue. The time order can denote the logical sequence or order in which writes, or more generally the replication queue entries, can be applied. From the step 1306, control proceeds to the step 1308.

The R1 and R2 systems can be log based systems each maintaining a transaction log. As such, at the step 1308, for each of the write I/O operations or requests received at the R1 system, the step 1308 can include recording the write I/O operation as an entry in the transaction log. On the R1 system, the writes recorded as transaction log entries on the R1 system transaction log can be flushed or destaged in an ongoing manner from the transaction log to the BE PDs of the R1 system. Each of the flushed transaction log entries of the R1 system representing a write of write data or content to a logical address can include storing the write data or content at a physical storage location or PLB of the BE PDs and updating mapping information which maps the logical address to the PLB containing the write data or content. From the step 1308, control proceeds to the step 1310.

At the step 1310, replication processing can be performed in a continuous ongoing manner to replicate writes or changes (e.g., modified content) of the source R1 LUN of the R1 system to the R2 system. The R2 system can apply the received writes or changes to the remote counter R2 LUN of the R2 system.

Figure 14A:
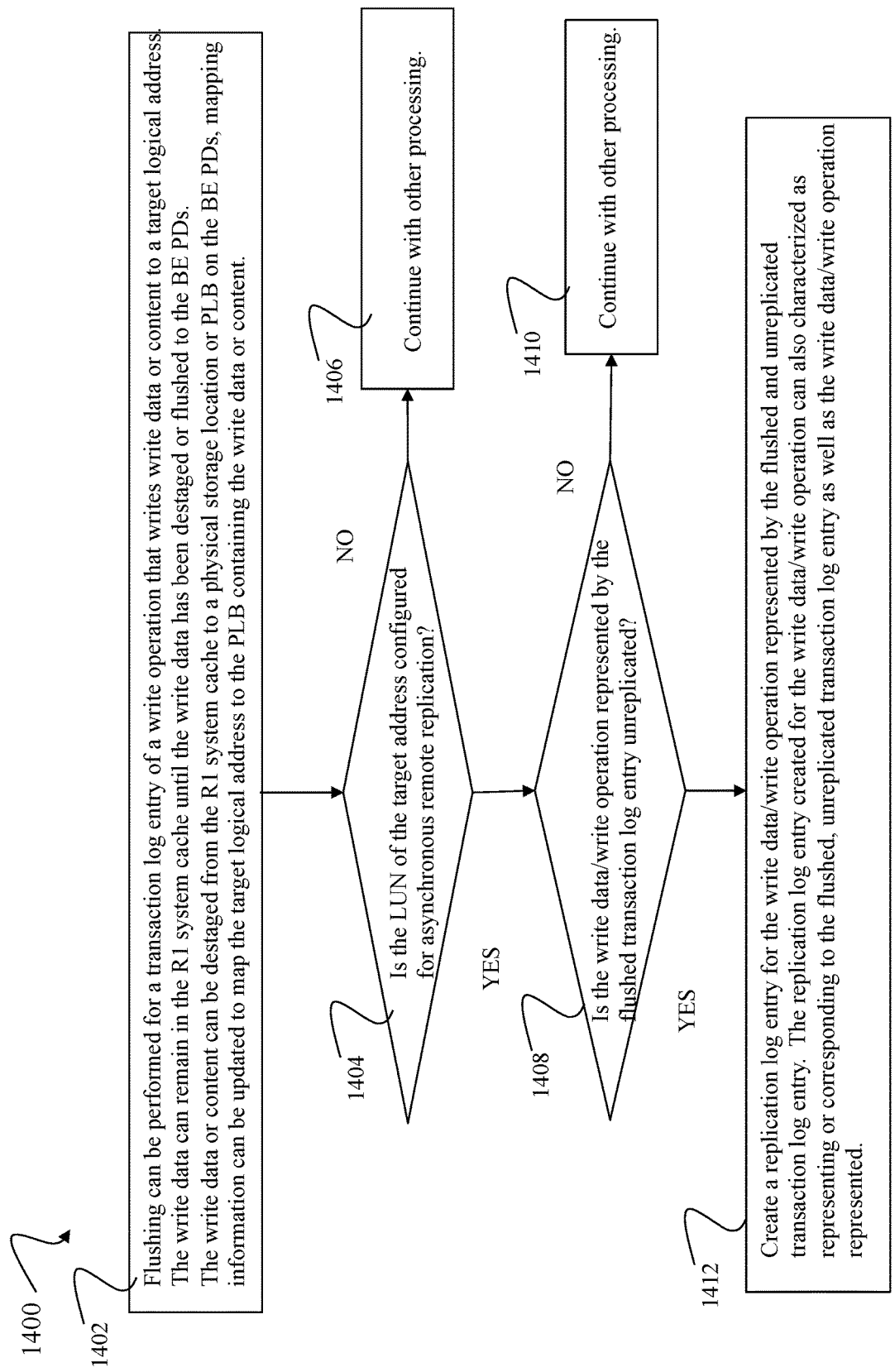

Referring to FIG. 14A, shown is another flowchart 1400 of processing steps that can be performed in at least one embodiment in accordance with the techniques of the present disclosure. The flowchart 1400 provides additional detail regarding processing that can be performed in connection with flushing entries for write operations from the transaction log in at least one embodiment.

At the step 1402, flushing can be performed for a transaction log entry of a write operation that writes write data or content to a target logical address. The write data can remain in the R1 system cache until the write data has been destaged or flushed to the BE PDs. The write data or content can be destaged from the R1 system cache to a physical storage location or PLB on the BE PDs, mapping information can be updated to map the target logical address to the PLB containing the write data or content. From the step 1402, control proceeds to the step 1404.

At the step 1404, a determination can be made as to whether the LUN of the target logical address of the write operation represented by the transaction log entry is configured for asynchronous remote replication. If the step 1404 evaluates to no, control proceeds to the step 1406 to continue with other processing. If the step 1404 evaluates to yes, control proceeds to the step 1408. At the step 1408, a determination can be made as to whether the write data/write operation represented by the transaction log entry being processed/flushed is unreplicated. If the step 1408 evaluates to no, control proceeds to the step 1410 to continue with other processing. If the step 1408 evaluates to yes, control proceeds to the step 1412.

At the step 1412, processing can be performed to create a replication log entry for the write data/write operation represented by the flushed and unreplicated transaction log entry. The replication log entry created for the write data/write operation can also characterized as representing or corresponding to the flushed, unreplicated transaction log entry as well as the write data/write operation represented.

Figure 14B:
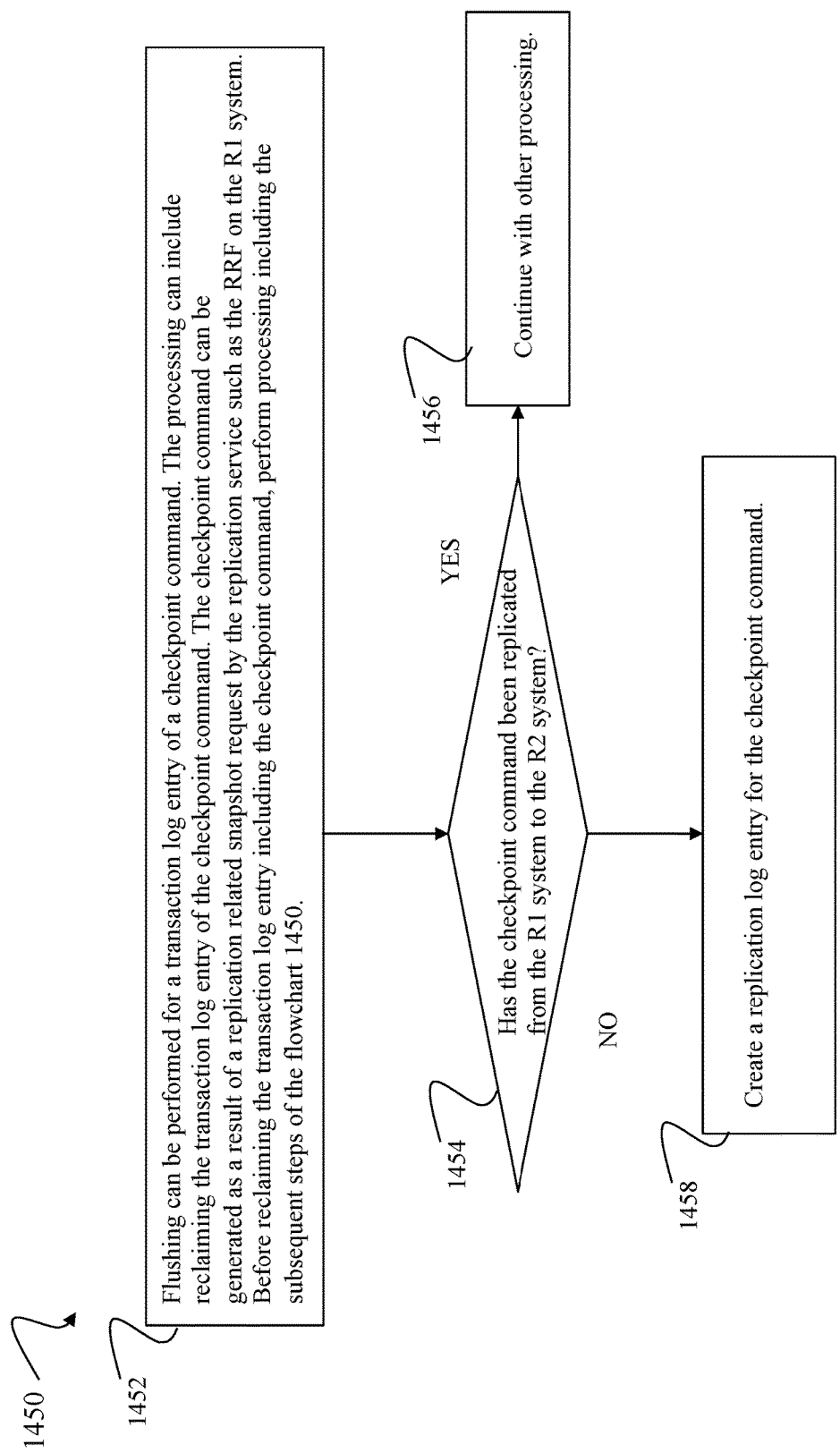

Referring to FIG. 14B, shown is another flowchart 1450 of processing steps that can be performed in at least one embodiment in accordance with the techniques of the present disclosure. The flowchart 1450 provides additional detail regarding processing that can be performed in connection with flushing entries that are checkpoint records from the transaction log in at least one embodiment.

At the step 1452, flushing can be performed for a transaction log entry of a checkpoint record. The processing can include reclaiming the transaction log entry of the checkpoint record. The checkpoint record can be generated as a result of a replication related snapshot request by the replication service such as the RRF on the R1 system. Before reclaiming the transaction log entry including the checkpoint record, perform processing including the subsequent steps of the flowchart 1450. From the step 1452, control proceeds to the step 1454.

At the step 1454, a determination can be made as to whether the checkpoint record being processed has already been replicated from the R1 system to the R2 system. If the step 1454 evaluates to yes, control proceeds to the step 1456 to continue with other processing. If the step 1454 evaluates to no, control proceeds to the step 1458. At the step 1458, processing can be performed to create a replication log entry for the checkpoint record.

Figure 15A:
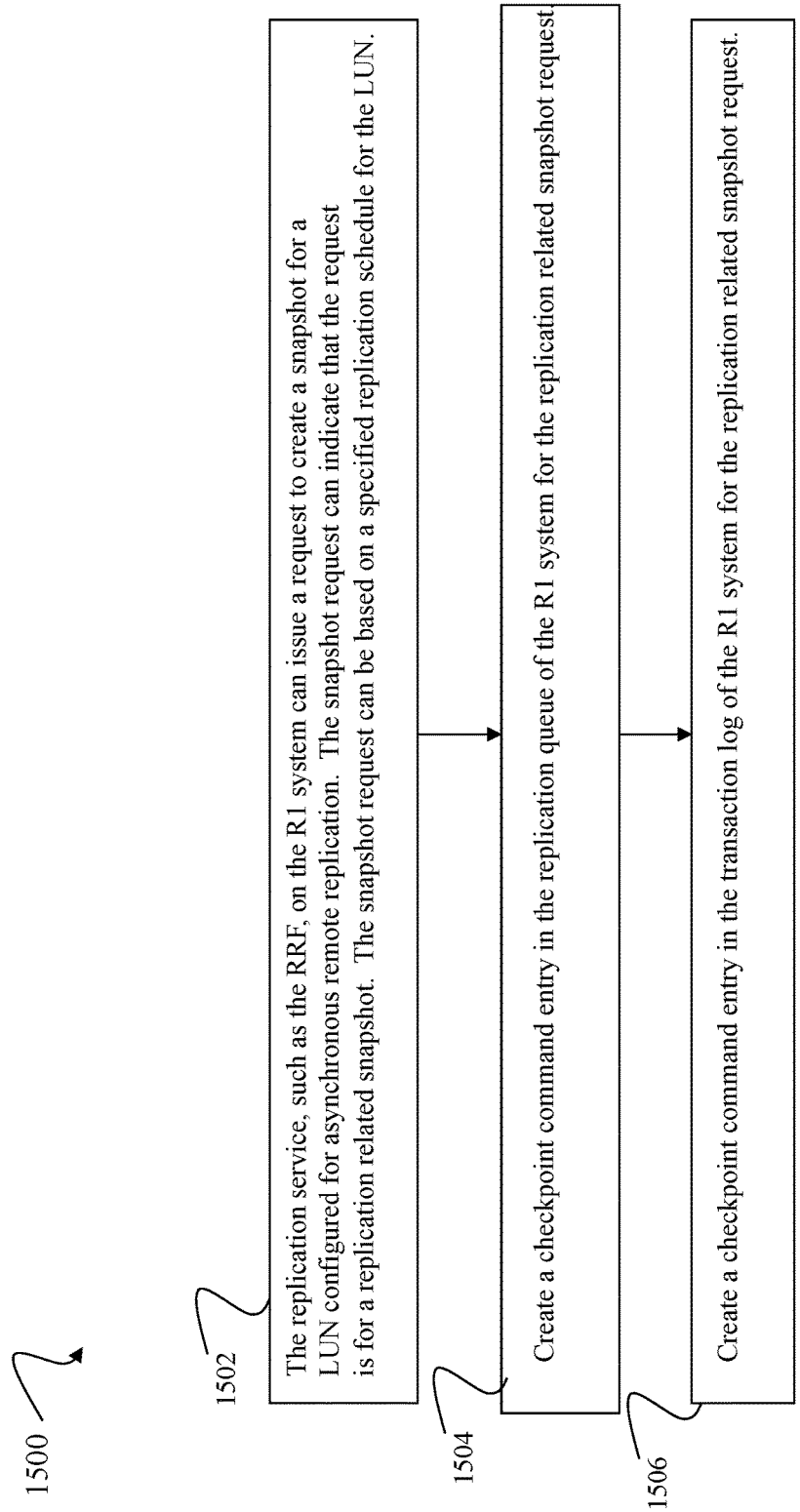

Referring to FIG. 15A, shown is another flowchart 1500 of processing steps that can be performed in at least one embodiment in accordance with the techniques of the present disclosure. The flowchart 1500 provides additional detail regarding replication processing that can be performed on the R1 system in at least one embodiment.

At the step 1502, the replication service, such as the RRF, on the R1 system can issue a request to create a snapshot for a LUN configured for asynchronous remote replication. The snapshot request can indicate that the request is for a replication related snapshot. The snapshot request can be based, for example, on a specified replication schedule for the LUN. From the step 1502, control proceeds to the step 1504.

At the step 1504, processing can be performed to create a checkpoint or barrier entry in the replication queue of the R1 system for the replication related snapshot request. From the step 1504, control proceeds to the step 1506.

At the step 1506, processing can be performed to create a checkpoint or barrier entry in the transaction log of the R1 system for the replication related snapshot request.

Figure 15B:
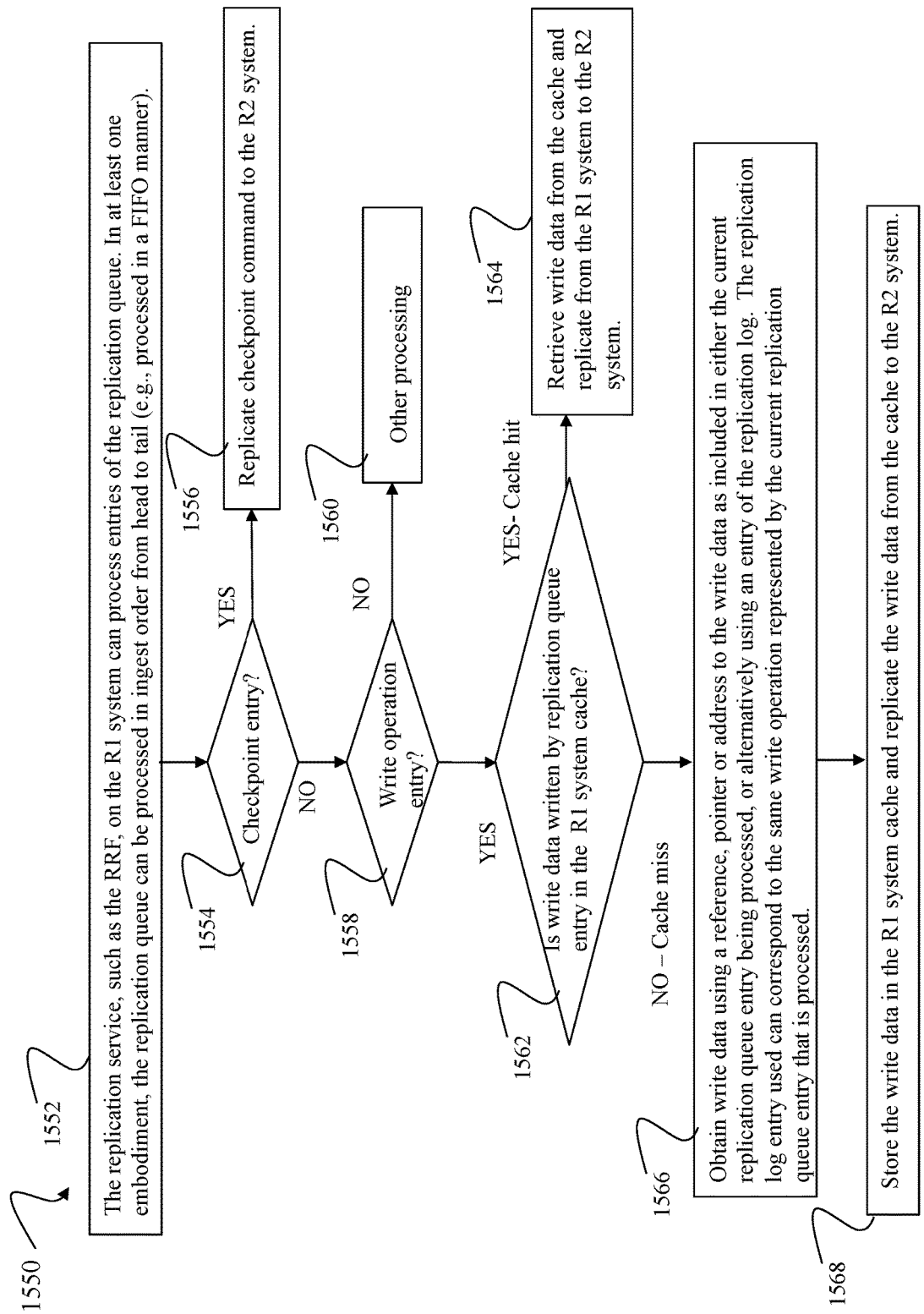

Referring to FIG. 15B, shown is another flowchart 1550 of processing steps that can be performed in at least one embodiment in accordance with the techniques of the present disclosure. The flowchart 1550 provides additional detail regarding replication processing that can be performed on the R1 system in at least one embodiment.

At the step 1552, the replication service, such as the RRF, on the R1 system can process entries of the replication queue and generally replicate write data and checkpoint records denoted by the replication queue entries from the R1 system to the R2 system. In at least one embodiment, the replication queue can be processed in ingest order from head to tail (e.g., processed in a FIFO manner). From the step 1552, control proceeds to the step 1554. The following steps of FIG. 15B provide detail regarding processing a single replication queue entry. More generally, the replication service can repeat such processing for other replication queue entries.

At the step 1554, a determination can be made as to whether the current replication queue entry being processed is a checkpoint entry. If the step 1554 evaluates to yes, control proceeds to the step 1556. At the step 1556, processing can be performed to replicate the checkpoint record from the R1 system to the R2 system If the step 1554 evaluates to no, control proceeds to the step 1558.

At the step 1558, a determination can be made as to whether the current replication queue entry represents a received, recorded write operation. If the step 1558 evaluates to no, control proceeds to the step 1560 where other processing can be performed. If the step 1558 evaluates to yes, control proceeds to the step 1562.

At the step 1562, a determination can be as to whether the write data or content written by the current replication queue entry is in the R1 system cache. If the step 1562 evaluates to yes indicating a cache hit, control proceeds to the step 1564. At the step 1564, processing can be performed to retrieve the write data from the R1 system cache and replicate the write data from the R1 system to the R2 system. Generally, when replicating the write data or modified content, additional information can also be replicated. For example, the additional information can include the target logical address at which the write data is stored on the R1 system.

If the step 1562 evaluates to no indicating a cache miss, control proceeds to the step 1566. At the step 1566, processing can be performed to obtain the write data or content written by the replication queue entry using a reference, pointer or address to the write data, The reference, pointer or address can be included in either the current replication queue entry being processed, or alternatively using an entry of the replication log. The replication log entry used can correspond to the same write operation represented by the current replication queue entry that is processed. From the step 1566, control proceeds to the step 1568.

At the step 1568, processing can be performed to store the retrieved write data in the R1 system cache and replicate the write data from the R1 system cache to the R2 system.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
   receiving, at a source system, a first write directed to a source logical device configured for asynchronous remote replication to a target logical device of a destination system;
   performing first processing on the source system that flushes a first transaction log entry of a transaction log of the source system, said first processing including:
      determining for the first transaction log entry, which represents the first write storing first content to a target logical address, that the first write is directed to the source logical device configured for asynchronous remote replication and that the first content has not been replicated from the source system to the destination system; and
      creating a first replication log entry for the first write and the first content in a replication log of the source system, wherein the first replication log entry includes a reference to a first storage location of the first content, wherein the replication log includes entries corresponding to other entries of the transaction log which have been flushed from the transaction log and which represent content and checkpoint commands that have not been replicated from the source system to the destination system; and
   performing replication processing that uses a replication queue including a first replication queue entry corresponding to the first write that stores the first content to the target logical address, the replication processing including:
      determining, for the first replication queue entry, that the first content written to the target logical address is not in a cache of the source system thereby resulting in a cache miss;
      responsive to the cache miss, retrieving the first content from the first storage location using the reference to the first storage location, wherein the reference to the first storage location is obtained from the first replication log entry or the first replication queue entry corresponding to the first write; and
      replicating the first content stored at the target logical address by the first written operation from the source system to the destination system.

2. The computer-implemented method of claim 1, wherein the transaction log includes a second transaction log entry for a first checkpoint command.

3. The computer-implemented method of claim 2, further comprising:
   issuing, by a replication service of the source system, a request to create a snapshot for the source logical device configured for asynchronous remote replication; and
   responsive to said issuing, creating the second transaction log entry in the transaction log and creating a second replication queue entry in the replication queue for the first checkpoint command.

4. The computer-implemented method of claim 2, further comprising:
   performing second processing on the source system that flushes the second transaction log entry, said second processing including:
      determining the first checkpoint command of the second transaction log entry has not been replicated from the source system to the destination system; and
      creating a second replication log entry for the first checkpoint command in the replication log.

5. The computer-implemented method of claim 4, further comprising:
   replicating, in accordance with the second replication queue entry, the first checkpoint command from the source system to the target system.

6. The computer-implemented method of claim 1, wherein said replication processing further comprises:
   replicating a first checkpoint command and a second checkpoint command from the source system to the destination system;
   replicating a plurality of writes from the source system to the destination system, wherein each of the plurality of writes is included between the first checkpoint command and the second checkpoint command, and wherein the second plurality of writes are directed to the source logical device; and
   creating, on the destination system in accordance with the first checkpoint command and the second checkpoint command, a first snapshot of the target logical device on the destination system, wherein the first snapshot includes the plurality of writes.

7. The computer-implemented method of claim 1, wherein the replication queue is stored in volatile memory of the source system, the replication log is persistently stored on the source system, and the transaction log is persistently stored on the source system.

8. The computer-implemented method of claim 7, further comprising:
   performing restoration processing that restores the replication queue using the replication log and the transaction log.

9. The computer-implemented method of claim 8, wherein said restoration processing that restores the replication queue further comprises:
   identifying one or more unreplicated transaction log entries, wherein each of the one or more unreplicated transaction log entries is an entry of the transaction log for a write operation that writes content which has not been replicated from the source system to the target system; and
   constructing the replication queue which includes the one or more unreplicated transaction log entries and each entry of the replication log.

10. The computer-implemented method of claim 9, where the restoration processing further comprises:
  sorting, based on a time order, the one or more unreplicated transaction log entries and each entry of the replication log.

11. The computer-implemented method of claim 10, wherein the time order indicates a relative logical ordering in which to process entries of the replication queue.

12. The computer-implemented method of claim 11, wherein the restoration processing is performed responsive to rebooting the source system.

13. The computer-implemented method of claim 11, wherein the restoration processing is included in recovery processing, and wherein the recovery processing is performed on the source system responsive to an event causing the source system to become unavailable or go offline.

14. The computer-implemented method of claim 1, further comprising:
  receiving a plurality of writes at the source system, wherein each of the plurality of writes is directed to a logical device of the source system configured for asynchronous remote replication;
  creating a plurality of replication queue entries in the replication queue of the source system for the plurality of write operations; and
  creating a plurality of transaction log entries in the transaction log of the source system for the plurality of write operations.

15. A system comprising:
  one or more processors; and
  a memory comprising code stored thereon that, when executed, performs a method comprising:
    receiving, at a source system, a first write directed to a source logical device configured for asynchronous remote replication to a target logical device of a destination system;
    performing first processing on the source system that flushes a first transaction log entry of a transaction log of the source system, said first processing including:
      determining for the first transaction log entry, which represents the first write storing first content to a target logical address, that the first write is directed to the source logical device configured for asynchronous remote replication and that the first content has not been replicated from the source system to the destination system; and
      creating a first replication log entry for the first write and the first content in a replication log of the source system, wherein the first replication log entry includes a reference to a first storage location of the first content, wherein the replication log includes entries corresponding to other entries of the transaction log which have been flushed from the transaction log and which represent content and checkpoint commands that have not been replicated from the source system to the destination system; and
    performing replication processing that uses a replication queue including a first replication queue entry corresponding to the first write that stores the first content to the target logical address, the replication processing including:
      determining, for the first replication queue entry, that the first content written to the target logical address is not in a cache of the source system thereby resulting in a cache miss;
      responsive to the cache miss, retrieving the first content from the first storage location using the reference to the first storage location, wherein the reference to the first storage location is obtained from the first replication log entry or the first replication queue entry corresponding to the first write; and
      replicating the first content stored at the target logical address by the first written operation from the source system to the destination system.

16. The system of claim 15, wherein the transaction log includes a second transaction log entry for a first checkpoint command.

17. The system of claim 16, wherein the method further comprises:
  issuing, by a replication service of the source system, a request to create a snapshot for the source logical device configured for asynchronous remote replication; and
  responsive to said issuing, creating the second transaction log entry in the transaction log and creating a second replication queue entry in the replication queue for the first checkpoint command.

18. The system of claim 16, wherein the method further comprises:
  performing second processing on the source system that flushes the second transaction log entry, said second processing including:
    determining the first checkpoint command of the second transaction log entry has not been replicated from the source system to the destination system; and
    creating a second replication log entry for the first checkpoint command in the replication log.

19. The system of claim 18, wherein the method further comprises:
  replicating, in accordance with the second replication queue entry, the first checkpoint command from the source system to the target system.

20. A non-transitory computer readable medium comprising code stored thereon that, when executed, performs a method comprising:
  receiving, at a source system, a first write directed to a source logical device configured for asynchronous remote replication to a target logical device of a destination system;
  performing first processing on the source system that flushes a first transaction log entry of a transaction log of the source system, said first processing including:
    determining for the first transaction log entry, which represents the first write storing first content to a target logical address, that the first write is directed to the source logical device configured for asynchronous remote replication and that the first content has not been replicated from the source system to the destination system; and
    creating a first replication log entry for the first write and the first content in a replication log of the source system, wherein the first replication log entry includes a reference to a first storage location of the first content, wherein the replication log includes entries corresponding to other entries of the transaction log which have been flushed from the transaction log and which represent content and checkpoint commands that have not been replicated from the source system to the destination system; and performing replication processing that uses a replication queue including a first replication queue entry corresponding to the first write that stores the first content to the target logical address, the replication processing including:
determining, for the first replication queue entry, that the first content written to the target logical address is not in a cache of the source system thereby resulting in a cache miss;
responsive to the cache miss, retrieving the first content from the first storage location using the reference to the first storage location, wherein the reference to the first storage location is obtained from the first replication log entry or the first replication queue entry corresponding to the first write; and
replicating the first content stored at the target logical address by the first written operation from the source system to the destination system.

* * * * *